United States Patent [19]
Sato et al.

[11] Patent Number: 5,428,721
[45] Date of Patent: Jun. 27, 1995

[54] DATA PROCESSING APPARATUS FOR EDITING IMAGE BY USING IMAGE CONVERSION

[75] Inventors: Fumitaka Sato; Ken Kishida, both of Tokyo, Japan

[73] Assignee: Kabushiki Kaisha Toshiba, Kawasaki, Japan

[21] Appl. No.: 649,976

[22] Filed: Feb. 4, 1991

[30] Foreign Application Priority Data

| Feb. 7, 1990 [JP] | Japan | 2-27937 |
| Apr. 27, 1990 [JP] | Japan | 2-113211 |
| Apr. 27, 1990 [JP] | Japan | 2-113236 |

[51] Int. Cl.$^6$ .............................. G06T 3/00
[52] U.S. Cl. ..................... 395/133; 395/136; 395/137; 395/138
[58] Field of Search ................ 395/133–138, 395/119–121, 155–158, 161; 382/44–46

[56] References Cited

U.S. PATENT DOCUMENTS

| H997 | 11/1991 | Bronson | 340/747 |
| 4,641,255 | 2/1987 | Hohmann | 395/135 |
| 4,752,828 | 6/1988 | Chapuis et al. | 395/136 X |
| 4,837,844 | 6/1989 | Urushibata | 395/136 X |
| 4,951,231 | 8/1990 | Dickinson et al. | 395/135 |
| 5,067,087 | 11/1991 | Seki et al. | 395/135 X |

OTHER PUBLICATIONS

Tutorial for Adobe Illustrator 88 TM, Adobe Systems Inc., pp. 1, 93–115, 1988.
Myers et al., "Garnet, Comprehensive Support for Graphical, Highly Interactive User Interfaces," IEEE Computer, vol. 23, No. 11, pp. 71–85, Nov. 1990.

*Primary Examiner*—Almis R. Jankus
*Attorney, Agent, or Firm*—Finnegan, Henderson, Farabow, Garrett & Dunner

[57] ABSTRACT

Translation handles are set on vertices of a conversion source image frame by a mouse. Frame move processing, enlargement/reduction processing, rotation processing, and deforming processing are performed in accordance with the number and positions of the set translation handles. The image within the frame is operated in accordance with the shape of the conversion source image frame, and the operated image is displayed within the conversion destination image frame. In geometric conversion which requires enlargement/reduction and rotation and preserves parallelism of lines, image conversion is performed by one processing including addition instructions and not including multiplication and division calculations.

13 Claims, 19 Drawing Sheets

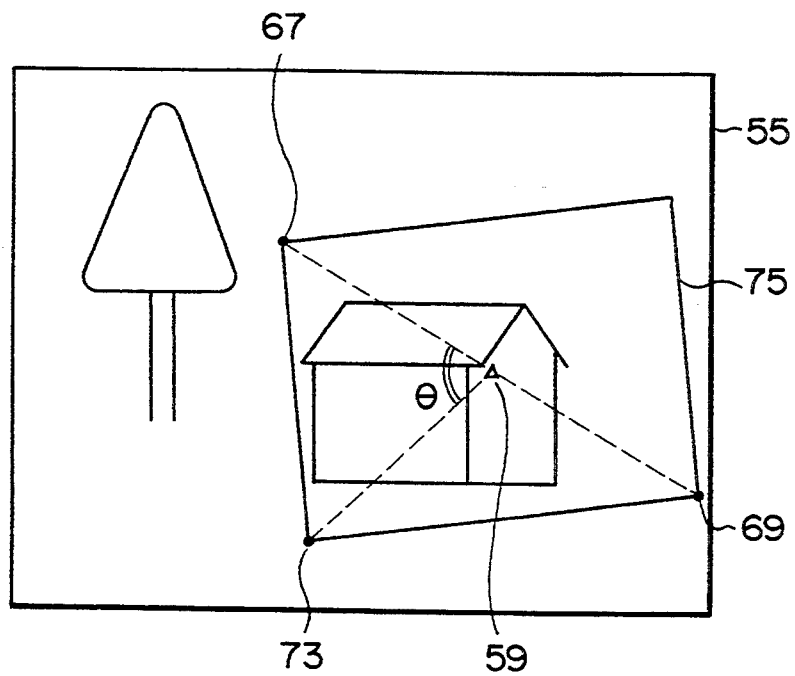
F I G. 14
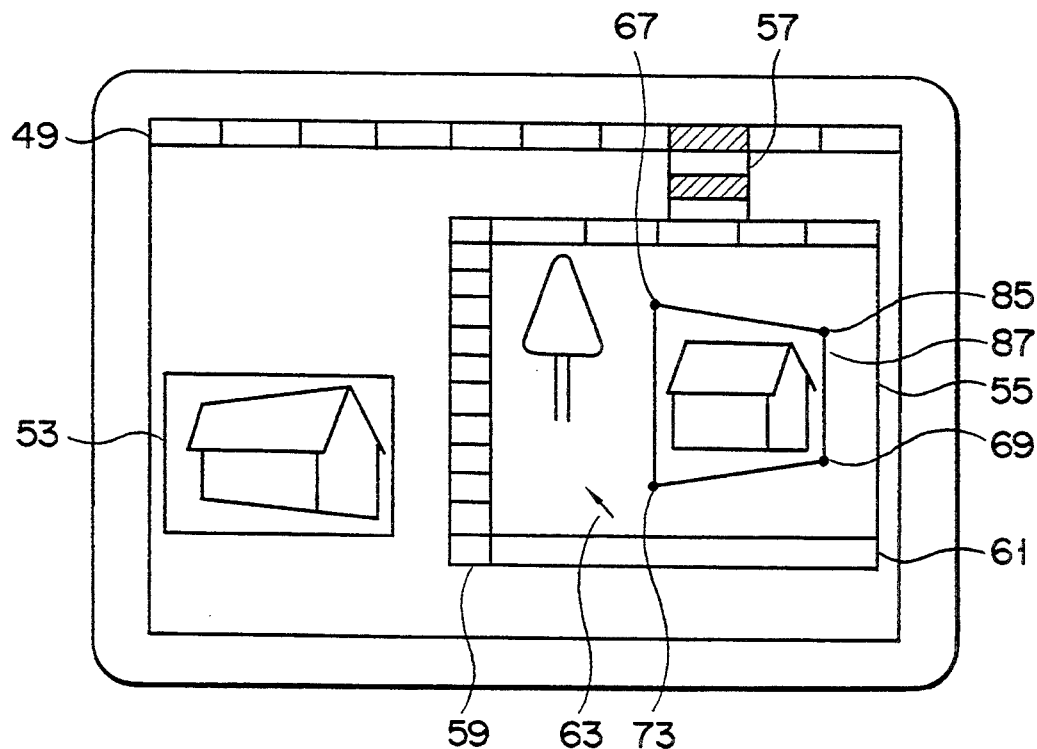
F I G. 15

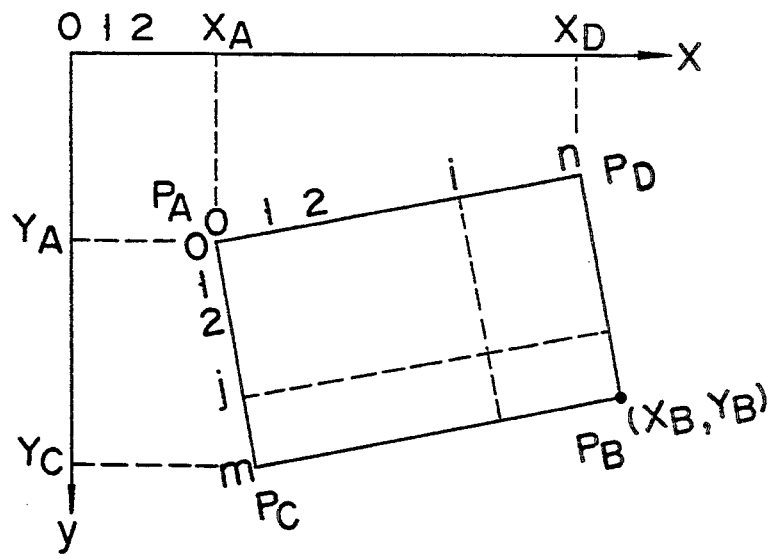
F I G. 16
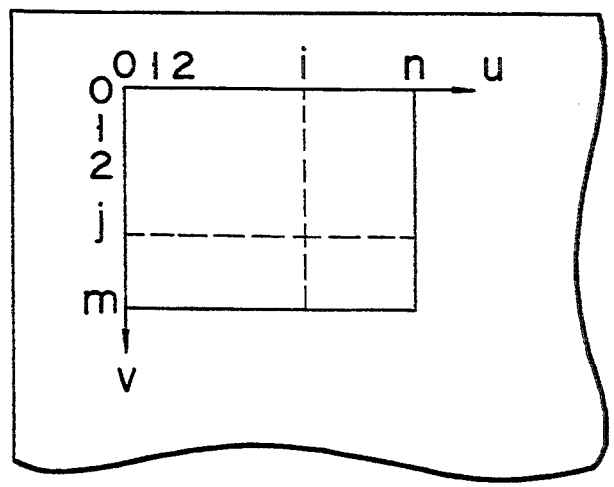
F I G. 17

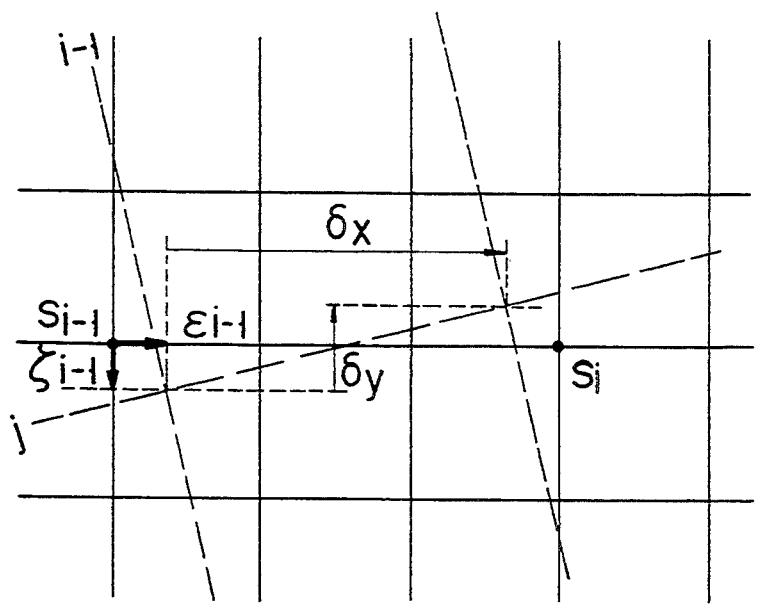
F I G. 18
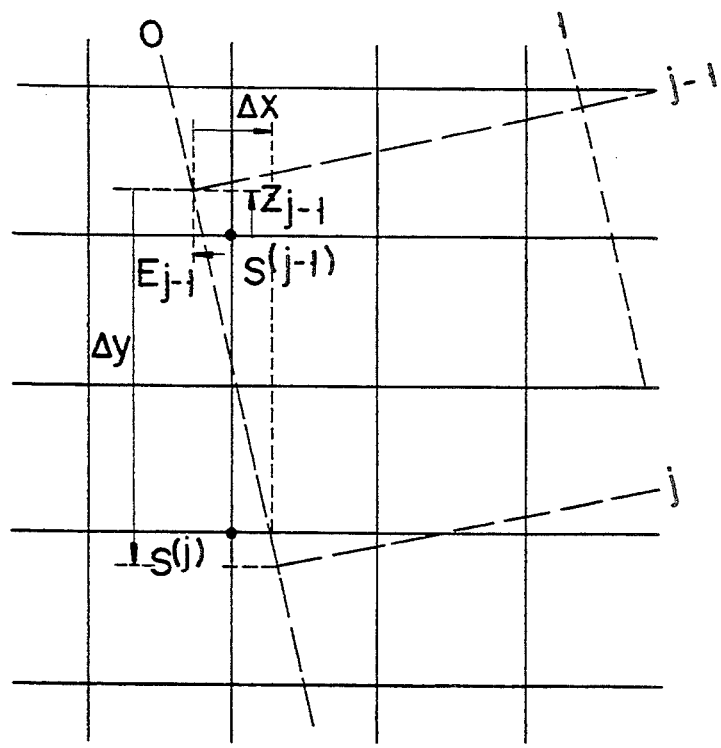
F I G. 19

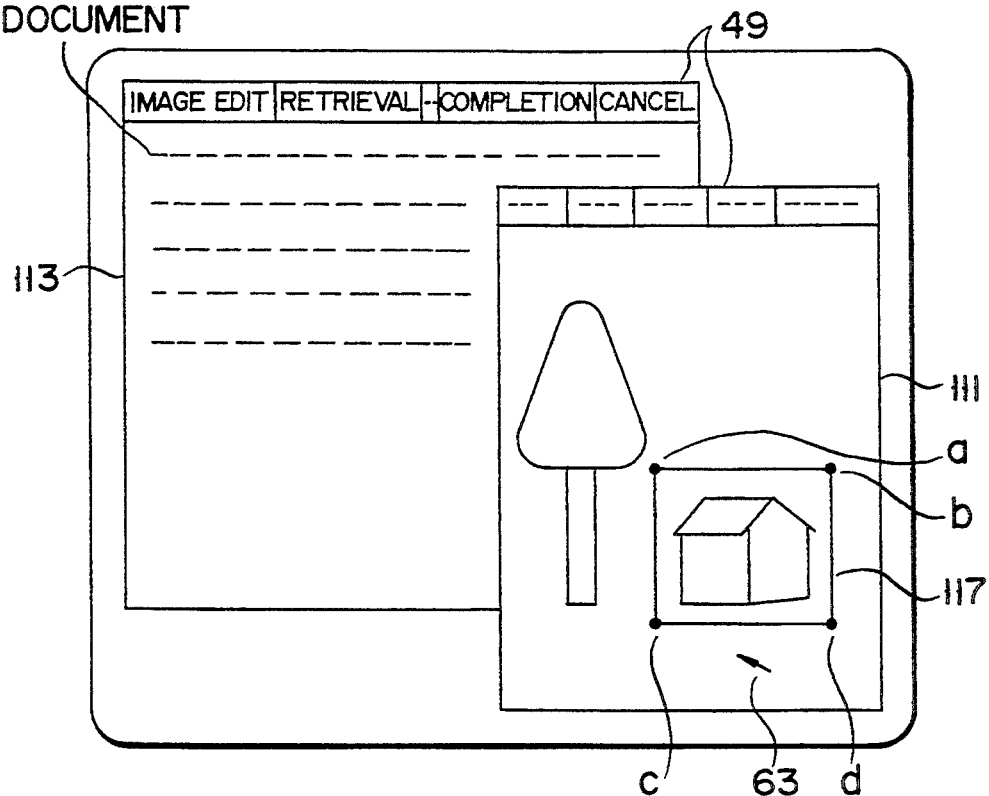
F I G. 22
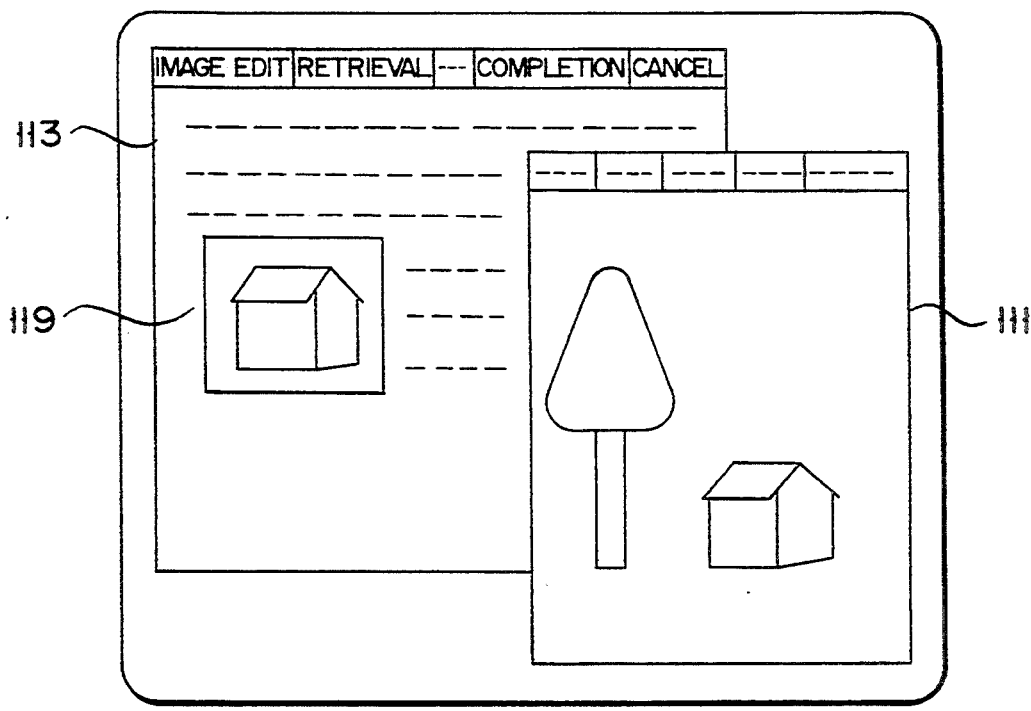
F I G. 23

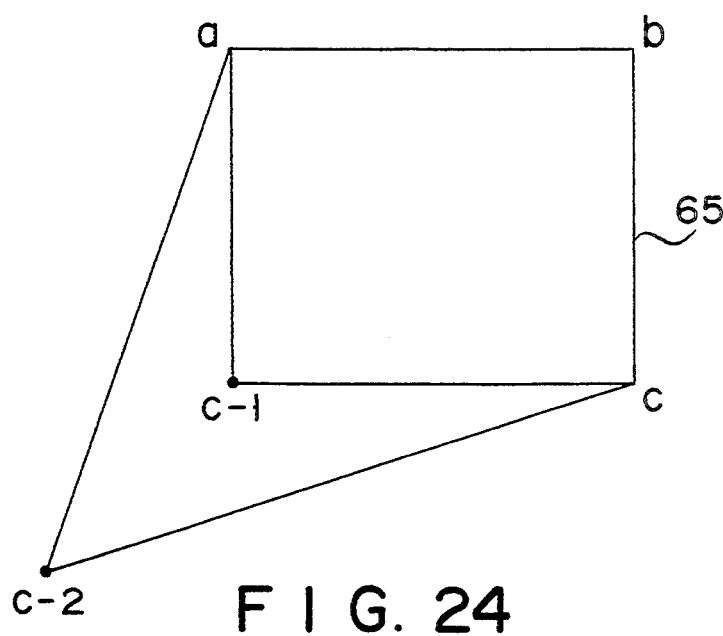
F I G. 24
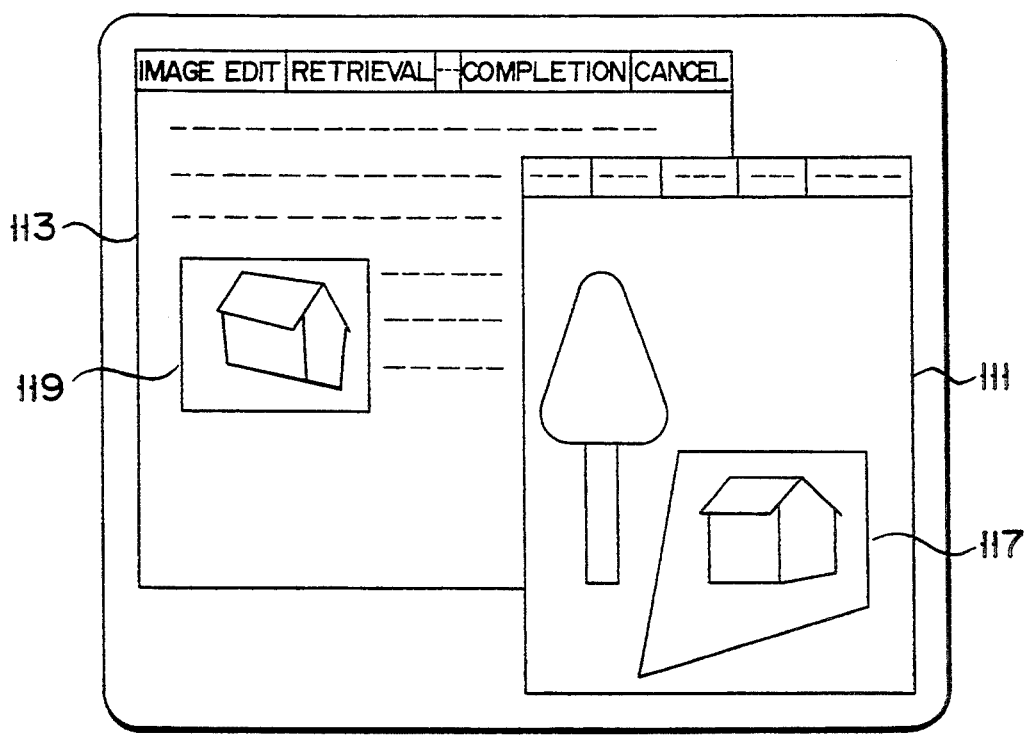
F I G. 25

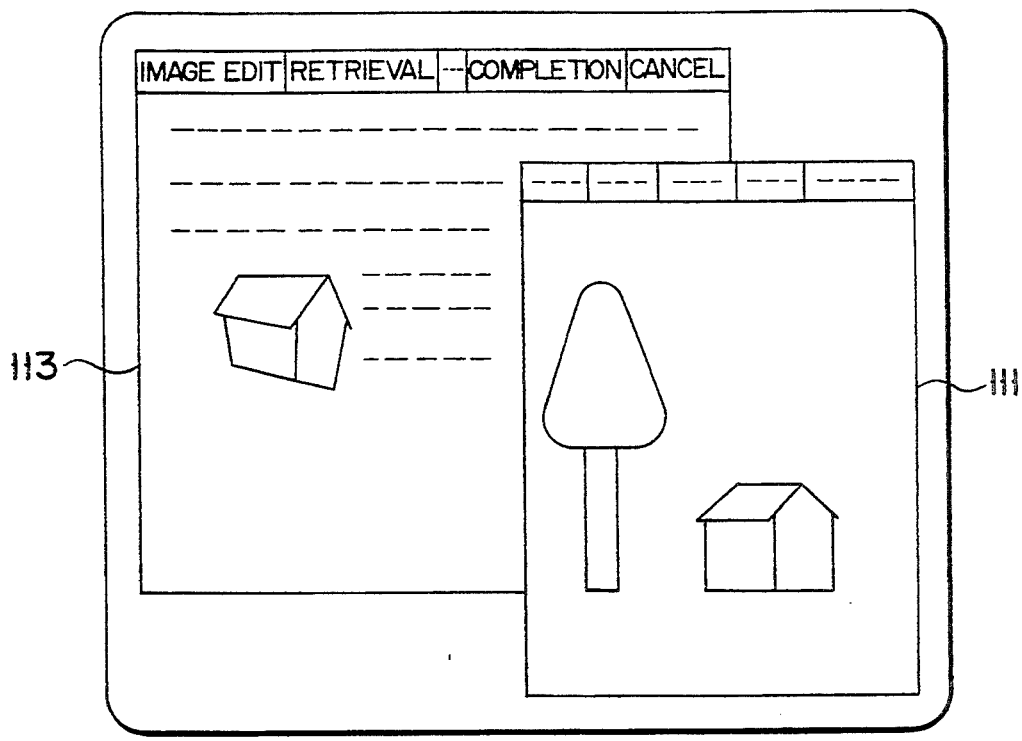
F I G. 26
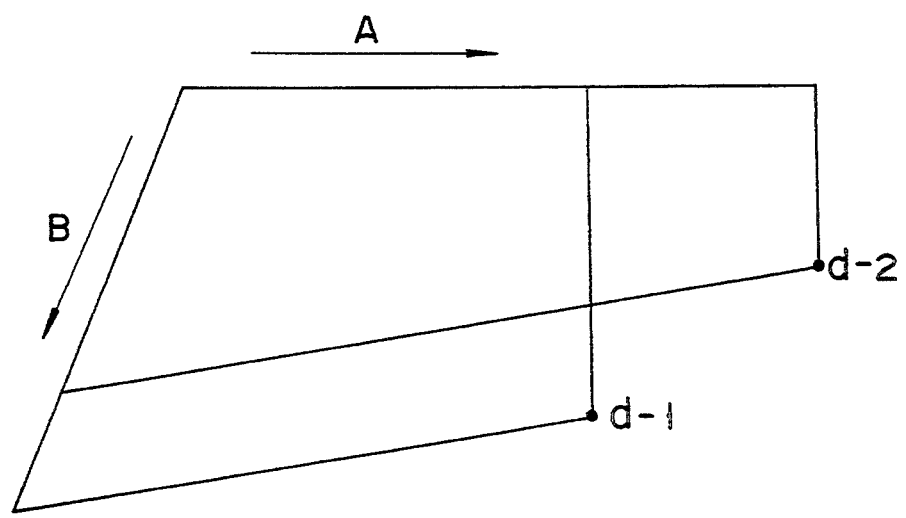
F I G. 27

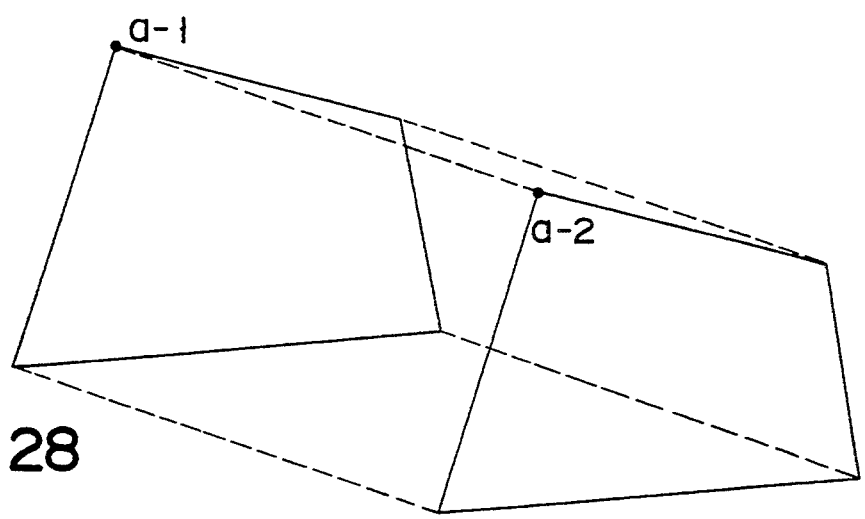
F I G. 28
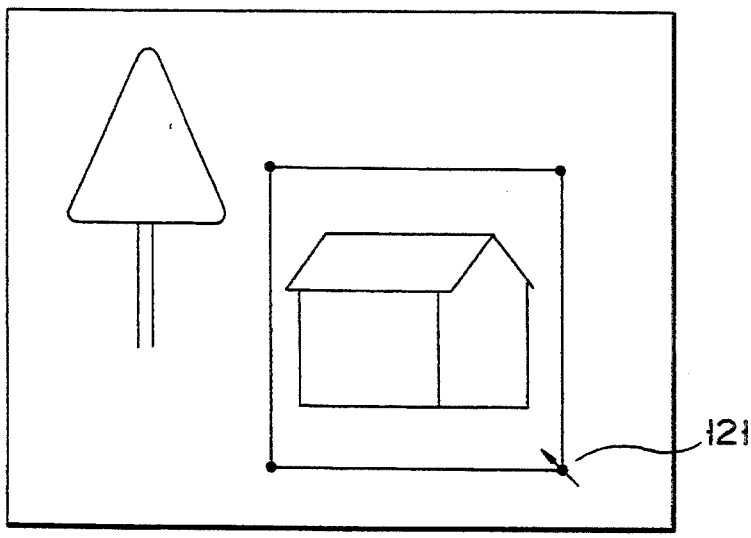
F I G. 29
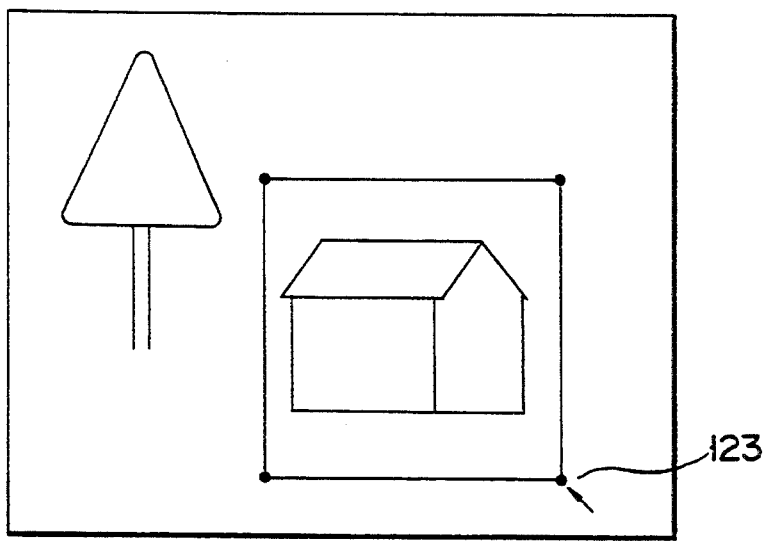
F I G. 30

DATA PROCESSING APPARATUS FOR EDITING IMAGE BY USING IMAGE CONVERSION

BACKGROUND OF THE INVENTION

1. Field of the Invention

The present invention relates to a data processing apparatus such as a workstation or a wordprocessor having functions of performing image operations (editing) such as movement, enlargement/reduction, rotation, and deforming of an image read by a scanner.

2. Description of the Related Art

Workstations and wordprocessors having image edit functions have been developed. A wordprocessor having image edit functions can insert an edited image in a created document. An example of a display screen prior to image editing in this wordprocessor is shown in FIG. 1. In this example, a plurality of virtual screens, called windows, are displayed on a screen of a display unit, thereby performing a multiwindow display. In the following description, an image before conversion is displayed in the first window, and a document is displayed in the second window. The image in the first window is partially converted, and the converted image is inserted in the document in the second window. An image before conversion is displayed in an image window 1, and a document in which an image is to be inserted is displayed in a document window 3. A cursor 5 indicates an arbitrary point in an image. The cursor 5 can move over a boundary between the image window 1 and the document window 3 so that it can be moved to an arbitrary point on the entire image. Menus 7 include various processing items such as image editing and retrieval. In this example, the image window 1 and the document window 3 have areas for displaying the menus 7, respectively.

The cursor 5 in the display screen is moved by designation from a pointing device such as a mouse or tablet. In addition, the cursor 5 is moved to start various types of processing upon operation of a switch arranged on the pointing device. Main operation methods of the pointing device and the switch are the following three methods:

(i) A cursor 5 is moved to a given point in a display screen by the pointing device, and the switch is turned on and then immediately turned off. This operation is called "picking" a point.

(ii) A point corresponding to any one of items of the menus 7 within the frame is picked to start processing displayed within the frame. Picking of each processing is called selection of the processing. The menus 7 are kept displayed in the windows 1 and 3. There are many items on menus 7 which are not directly associated with image editing, such as "cancel". This "cancel" item can be used any time in a step which waits for a switching operation. When the "cancel" item is selected, immediately preceding processing is canceled.

(iii) The cursor 5 is moved to a given point and the switch is turned on. The cursor 5 is moved while the switch is kept ON. When the switch is turned off, certain processing is performed for the turn-on position and the turn-off position. The switch (e.g., a mouse button) of the pointing device is depressed at the given point, the mouse is moved with the switch being kept ON, and the button is then released at a new position. These operations are called dragging. In particular, when dragging is started at a specific point such as a vertex of a rectangular frame (to be described later) set within the window 1 at the time of image editing, and this position is moved to a destination at which dragging is completed (i.e., the switch is turned off), these operations are called "dragging" a point.

A method of performing conventional image conversion in a wordprocessor having an image edit function will be described below. Referring to FIG. 1, when an "image edit" function in the menus 7 in the document window 3 is selected, the image edit (conversion) function is evoked. When the "image edit" function is evoked, a menu (pull-down menu) representing items as a detailed processing content in "image edit" processing is displayed, as shown in FIG. 2. Enlargement/reduction, rotation, move, and deforming, i.e., new items of the processing contents in the "image edit" processing are displayed. These new items are used to select a type (processing content) of image conversion. When an item in the displayed pull-down menu is selected, one of the enlargement/reduction processing, rotation processing, move processing, and deforming processing is executed. For example, assume that the enlargement/reduction item is selected.

In the state shown in FIG. 2, when the "enlargement/reduction" item is selected, enlargement/reduction processing is executed. First, the displayed pull-down menu is deleted, and the state shown in FIG. 1 is restored. The position and size of a rectangular frame (to be referred to as a first frame hereinafter) for specifying an image as an editing target in the image window 1 are designated by move operations (i.e., dragging) of the cursor 5. An example of the display screen upon designation of the first frame is shown in FIG. 3. A rectangular frame (to be referred to as a second frame hereinafter) for designating a document window 3 area in which an image is to be inserted is similarly set. An example of the display screen in which the second frame is set is shown in FIG. 4. When the first and second frames are set, enlargement/reduction processing is performed at independent magnifications in the horizontal and vertical directions so that the image in the first frame can be fitted in the second frame. The enlarged/reduced image is displayed in the second frame. When the enlarged/reduced image is displayed in the second frame, the first and second frames are deleted, thereby completing the enlargement/reduction processing. An example of the display screen upon completion of the enlargement/reduction processing is shown in FIG. 5.

Rotation processing and move processing can be performed as in enlargement/reduction processing such that the pull-down menu is displayed upon selection of the "image edit" in the menus 7 and "rotation" or "move" is selected from this pull-down menu. In particular, when rotation processing is started, a rotation amount for the image within the first frame must be designated. The rotation amount is designated in units of 90° (i.e., 90°, 180°, 270°) and is selected from a menu representing rotation amounts. When selected processing (e.g., enlargement/reduction processing and rotation processing) is completed, the image edit function is completed.

As described above, in the conventional image edit function, when one processing operation (image conversion) is performed, image edit processing is completed. For this reason, when each processing is repeated in a trial and error way to insert a desired image in a document, the "image edit" item and an item representing its processing content must be selected to set the first and second frames.

The above conventional image edit function has the following problems.

(i) A user designates the "image edit" processing and an item representing each processing content such as "enlargement/reduction" to select desired processing to be executed. For this reason, at the image edit apparatus, the user must memorize an item name corresponding to desired processing in the menu. If the user does not know its item name, each item name displayed in the menus 7 must be selected, and this item must be executed to check the processing content. When an image edit apparatus becomes multifunctional, the number of items in the menu is increased. It thus becomes more difficult for the user to properly select a desired function (processing). For this reason, the conventional image edit apparatus is not necessarily convenient.

(ii) In the conventional image edit apparatus, every time image editing is performed, an item in a menu and first and second frames must be designated. When image editing is repeated in a trial and error, selection of the menu must be repeated, resulting in cumbersome operations. When image editing is repeated as described above, two frames must be designated each time although the user often wishes to only slightly deform the set frames. In addition, in this case, since the position and size of the frame set in the previous editing are not known, much time is required to insert a desired image in a desired document.

When image conversion functions are realized as programs in a general-purpose processor, conditional branch instructions and multiplication and division calculations are generally included in an innermost program loop which has the highest operation frequency. For this reason, pipeline errors occur even if pipeline processing is performed, and the operation speed cannot be increased.

SUMMARY OF THE INVENTION

It is an object of the present invention to provide a data processing apparatus capable of executing a plurality of functions for performing operations (editing) for an image in accordance with a series of systematic operations.

It is another object of the present invention to provide an image edit apparatus having operability capable of efficiently performing image editing.

It is still another object of the present invention to provide an image processing apparatus capable of performing image conversion processing requiring enlargement/reduction and rotation at high speed.

According to the first aspect of the present invention, there is provided a data processing apparatus comprising: a display unit for displaying an image; means for setting a target image display area for displaying a target image display area for displaying an operated image in a display screen of the display unit; means for setting a translation handle for designating a range of the image as an operation object; frame setting means for setting a frame whose shape and position are designated by at least one translation handle set by the translation handle setting means, the position of the translation handle being arbitrarily changed; image operating means for operating the image within the frame on the basis of the shape of the frame set by the setting means and the shape of the target image display area set by the display area setting means; and means for displaying the image operated by the image operating means in the target image display area.

According to the second aspect of the present invention, there is provided an image processing apparatus having an image operation function for geometric conversion for displaying an original image displayed on a display unit in a predetermined display area, comprising: means for obtaining two difference vectors having orthogonal directions on original image coordinates of the display area in accordance with an area arbitrarily designated in the original image and a processing display area and for separating coordinate components of each difference vector into an integral part and a decimal part; first density determining means for sequentially determining densities of coordinate positions in the display area on the basis of results obtained by sequentially adding the integral and decimal parts of the first difference vectors separated by the separating means while performing scanning in a first coordinate axis direction of the display area; second density determining means for sequentially determining densities of coordinate positions in the display area on the basis of results obtained by sequentially adding the integral and decimal parts of the second difference vectors separated by the separating means while performing scanning in a second coordinate axis direction of the display area; and means for determining the densities in the first coordinate axis direction by the first density determining means from the coordinate positions determined by the second density determining means.

According to the third aspect of the present invention, there is provided an image conversion method in an image processing apparatus having an image operation function for performing geometric conversion for displaying an original image displayed on a display unit in a predetermined display area, comprising the steps of: (a) obtaining two difference vectors having orthogonal coordinates of the display area in accordance with an area arbitrarily designated in the original image and a processing display area and for separating coordinate components of each difference vector into an integral part and a decimal part; (b) sequentially determining densities of coordinate positions in the display area on the basis of results obtained by sequentially adding the integral and decimal parts of the first difference vectors separated in the step (a) while performing scanning in a first coordinate axis direction of the display area; (c) sequentially determining densities of coordinate positions in the display area on the basis of results obtained by sequentially adding the integral and decimal parts of the second difference vectors separated in the step (a) while performing scanning in a second coordinate axis direction of the display area; and (d) determining the densities in the first coordinate axis direction by the first density determining step (b) from the coordinate positions determined by the second density determining step (c).

According to the present invention, the image within the frame set by the frame setting means is operated to be displayed within the target image area. That is, the frame shape for designating the range of the image as the operation object is arbitrarily set to perform a desired image operation. Setting (shape and position) of the frame is performed in accordance with the number of translation handles and a change in position. For example, when the first translation handle is set at, e.g., the upper left corner of the frame, the frame is moved or translated so as not to deform the shape in accordance with dragging of the position of the first translation handle. When the second translation handle is added to, e.g., the lower right corner of the frame, the position of this translation handle is dragged to keep an angle between the sides of the frame unchanged but to change the lengths of the sides. That is, the frame can be enlarged or reduced. When the third translation handle is added to the lower left corner of the frame, the frame is rotated by dragging the position of this translation handle. When the fourth translation handle is set at, e.g., the upper right corner of the frame, each translation handle is dragged to move the frame to any position. That is, the frame shape can be arbitrarily deformed.

Since image conversion is performed to properly fit the image designated by the conversion source image frame in the conversion destination image frame, the conversion content is determined by deforming the frame shape. The frame is deformed by moving one of the four vertices defining the frame shape to an arbitrary position. Frame deforming, frame rotation, frame enlargement/reduction, and frame move operations are performed in accordance with the shifted vertices. That is, the deforming, rotation, enlargement/reduction, and move of the image can be performed by arbitrarily changing the vertices of the frame.

When geometric conversion having a high utilization frequency to maintain parallelism between the lines is to be performed with enlargement/reduction and/or rotation, the conditional branch instructions and multiplication and division calculations are not included in the innermost loop of the program loops. That is, enlargement/reduction processing and rotation processing are performed by one processing of additions, thereby shortening the processing time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 13 and 14 are views showing a display screen for executing rotation processing;

FIG. 15 is a view showing a display screen for executing deforming processing;

FIGS. 16 through 19 are views for explaining geometric image conversion corresponding to flow charts shown in FIGS. 20A and 20B;

FIG. 22 is a view showing a display screen for setting a conversion source image frame;

FIG. 23 is a view showing a display screen for displaying an image within a conversion destination image frame;

FIG. 24 is a view for explaining setting of a frame when a point $\underline{c}$ of the conversion source image frame is dragged;

FIG. 25 is a view showing a display screen in which a converted image is displayed within the conversion destination image frame;

FIG. 26 is a view showing a display screen upon completion of image edit processing;

FIG. 27 is a view for explaining setting of a frame obtained by dragging a point $\underline{d}$ of the conversion source image frame;

FIG. 28 is a view for explaining a frame obtained by dragging a point $\underline{a}$ of the conversion source image frame; and FIGS. 29 and 30 are views for explaining deforming in deforming processing.

DETAILED DESCRIPTION OF THE PREFERRED EMBODIMENTS

Figure 1:
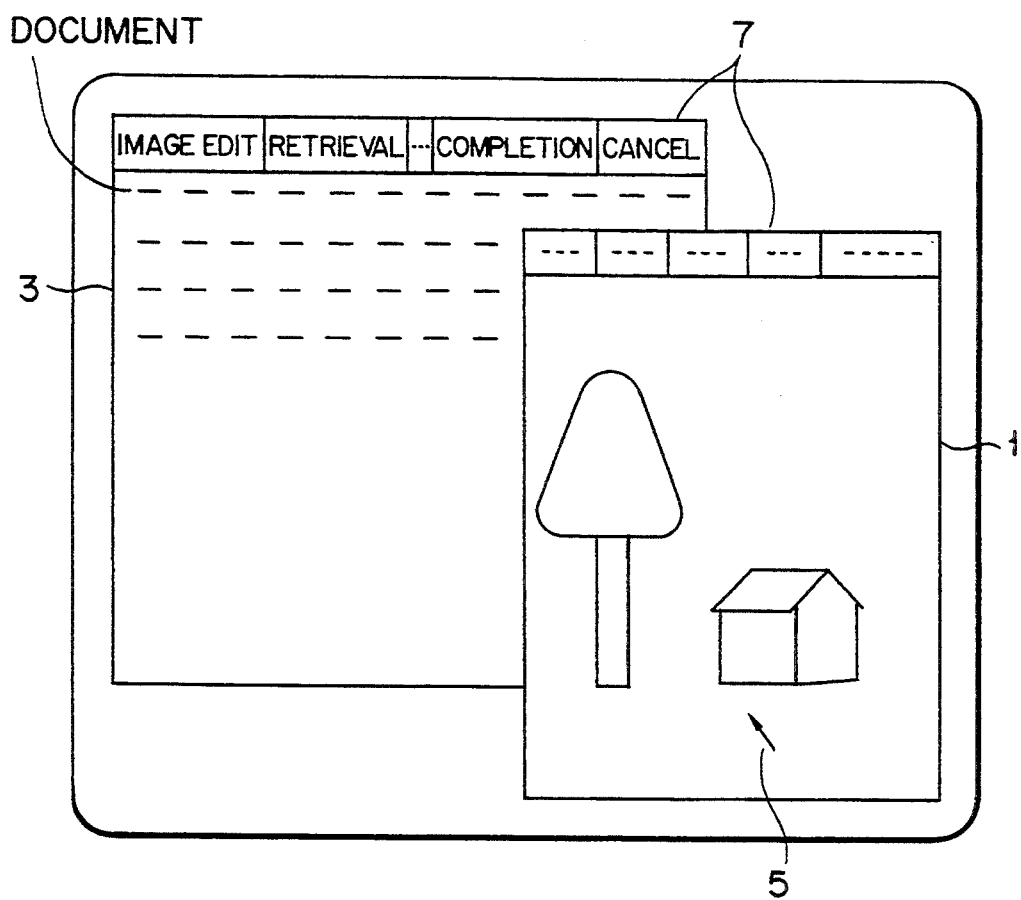
FIGS. 1 through 5 are views showing display screens for explaining conventional image edit processing.
Figure 2:
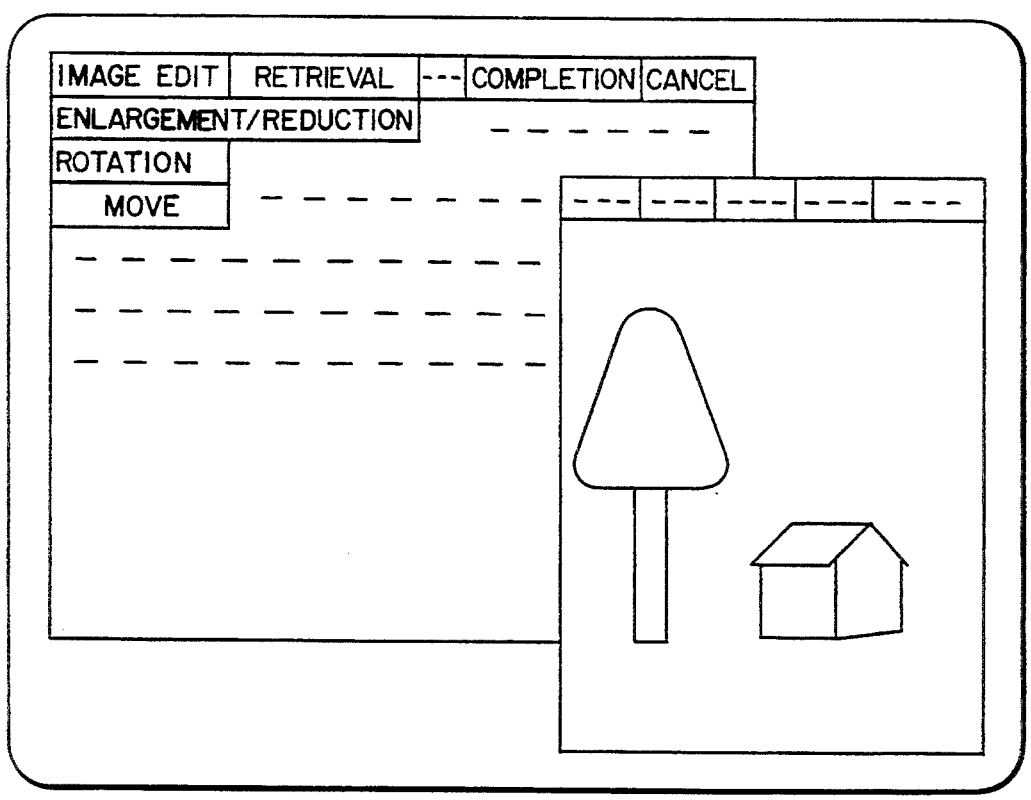
Figure 3:
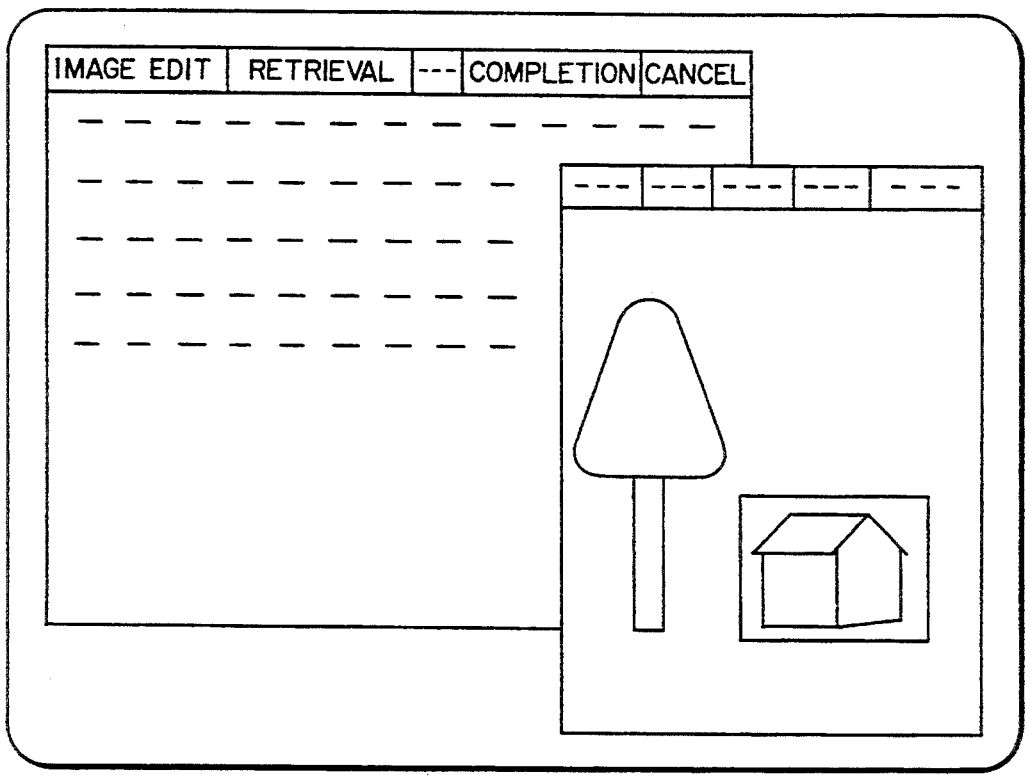
Figure 4:
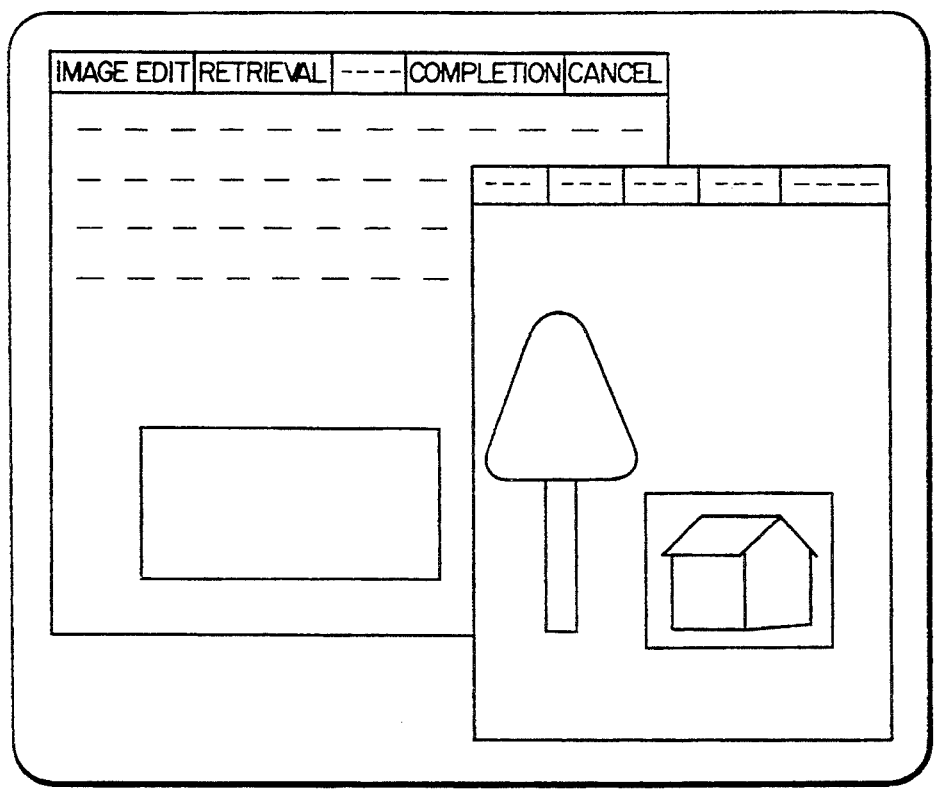
Figure 5:
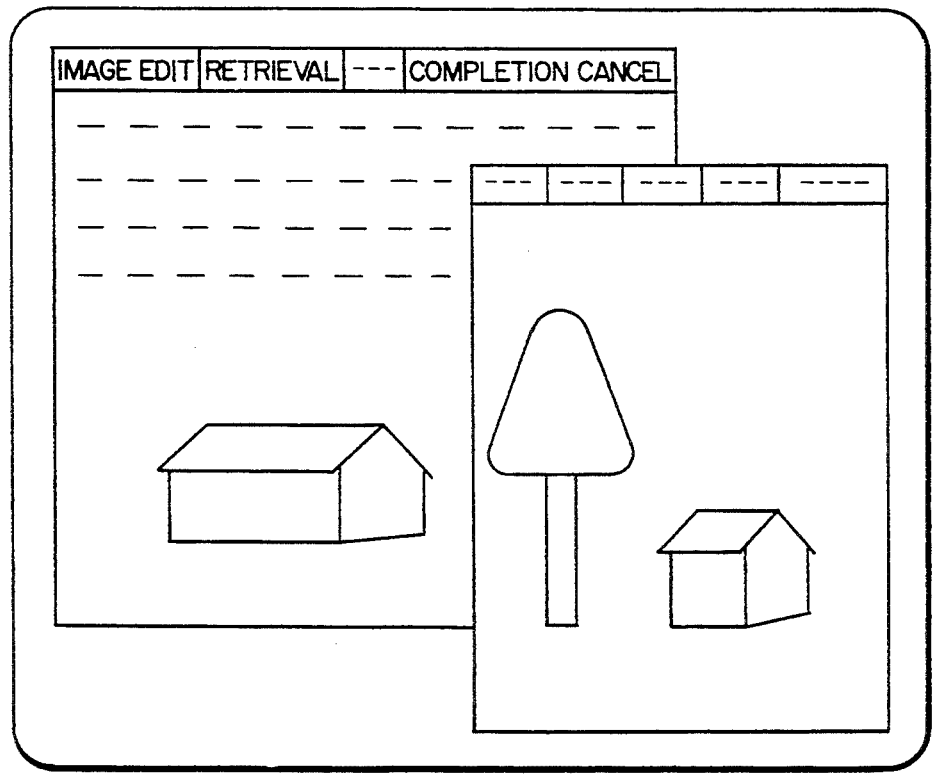
Figure 6:
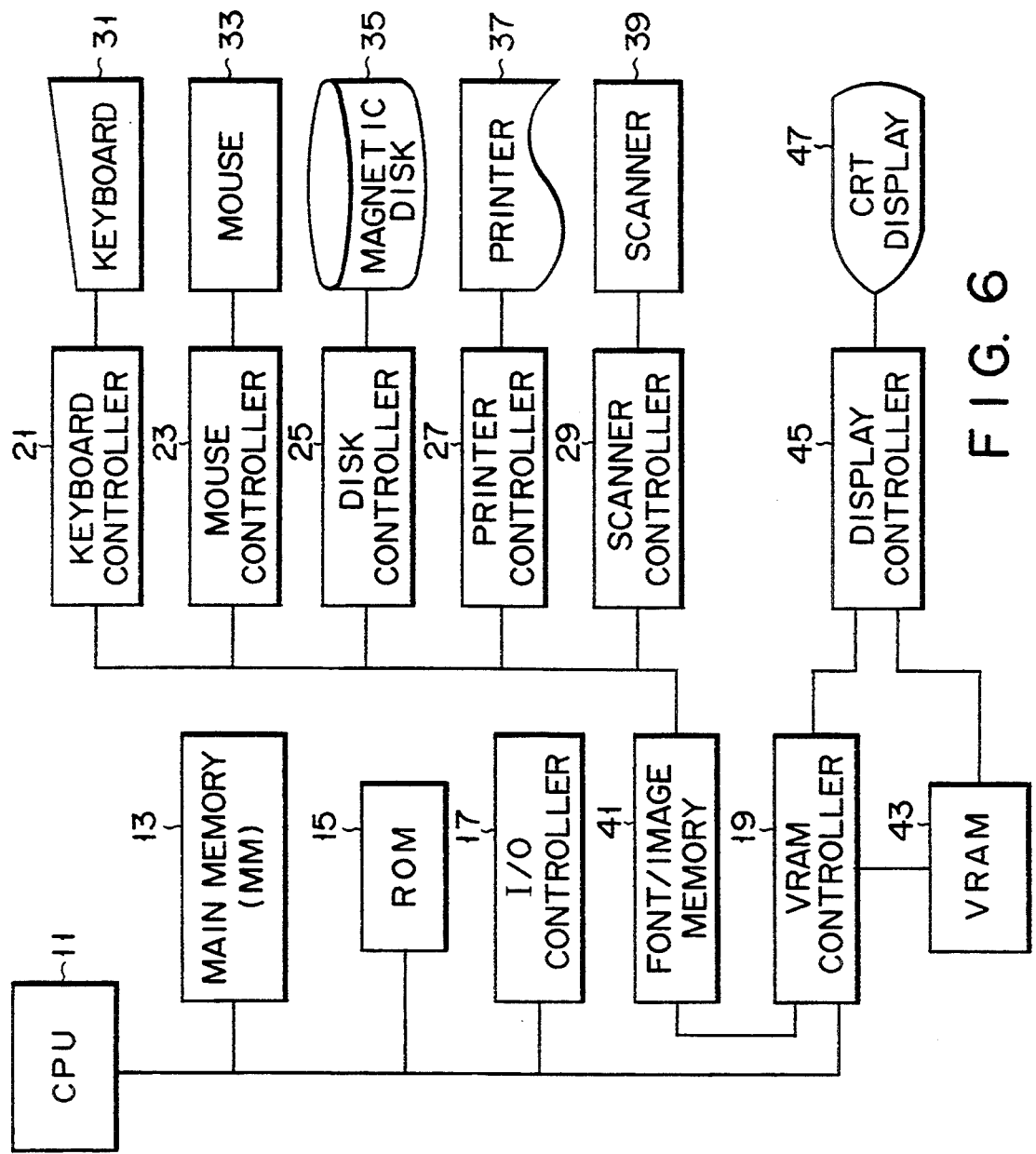
FIG. 6 is a block diagram showing an image processing apparatus according to an embodiment of the present invention.

Referring to FIG. 6, a CPU 11 controls the overall operation of a workstation in accordance with programs stored in a main memory (MM) 13 and a ROM 15. The MM 13 and the ROM 15 store programs and data for controlling the remaining components. In particular, these programs include a program for executing various types of edit functions for images, a frame setting program for setting a frame for designating the range of an image as an edit (operation) object, and a program for operating (converting) an image to be displayed in a target area within a set frame. Image operations include one-to-one size copying, enlargement/reduction, rotation, and deforming of images within the frames. The CPU 11 controls an input/output (I/O) controller 17 for controlling each peripheral device (to be described later) and a VRAM controller 19 for controlling a VRAM 43 (to be described later) for storing display screen data. A hardware control program is stored in a magnetic disk 35 (to be described later) and is transferred to the main memory 13, as needed. Instructions of a program written in the main memory 13 are transferred to and decoded and executed by the CPU 11 as execution of the program progresses. The I/O controller 17 is connected to a keyboard controller 21, a mouse controller 23, a disk controller 25, a printer controller 27, and a scanner controller 29. A keyboard 31 is connected to the keyboard controller 21; a mouse 33, to the mouse controller 23; the magnetic disk drive 35, to the disk controller 25; a printer 37, to the printer controller 27; and a scanner 39, to the scanner controller 29. The mouse 33 is used to designate a move of the mouse cursor, drag a translation handle (to be described later), and generate a new translation handle. The mouse 33 has, e.g., two buttons. In this embodiment, one of the buttons is used. The VRAM controller 19 is connected to a font/image memory 41 for storing fonts and images, the VRAM 43 for storing display image data, and a display controller 45 for controlling a display using image data stored in the VRAM 43. The display controller 45 is connected to a CRT display 47.

An operation of this embodiment will be described below.

An operation for inserting a desired image in an arbitrary position in a document while the document is created using a document creation function will be described below. The apparatus of this embodiment has a window function of opening a plurality of windows in the display screen of the CRT display 47 to display a plurality of documents and images.

An area in which an image is to be displayed (to be referred to as a target area 53 hereinafter) is set in a document creation window 51 set in a menu 49 for selecting various types of processing including editing of an image displayed on the CRT display 47. That is, two diagonal positions defining a rectangular frame are designated in a displayed document with an operation of the mouse 33. Data associated with the size and shape of the target area 53 are supplied as data defining enlargement/reduction and the like in order to perform image editing (image operation) to be described later.

Figure 7:
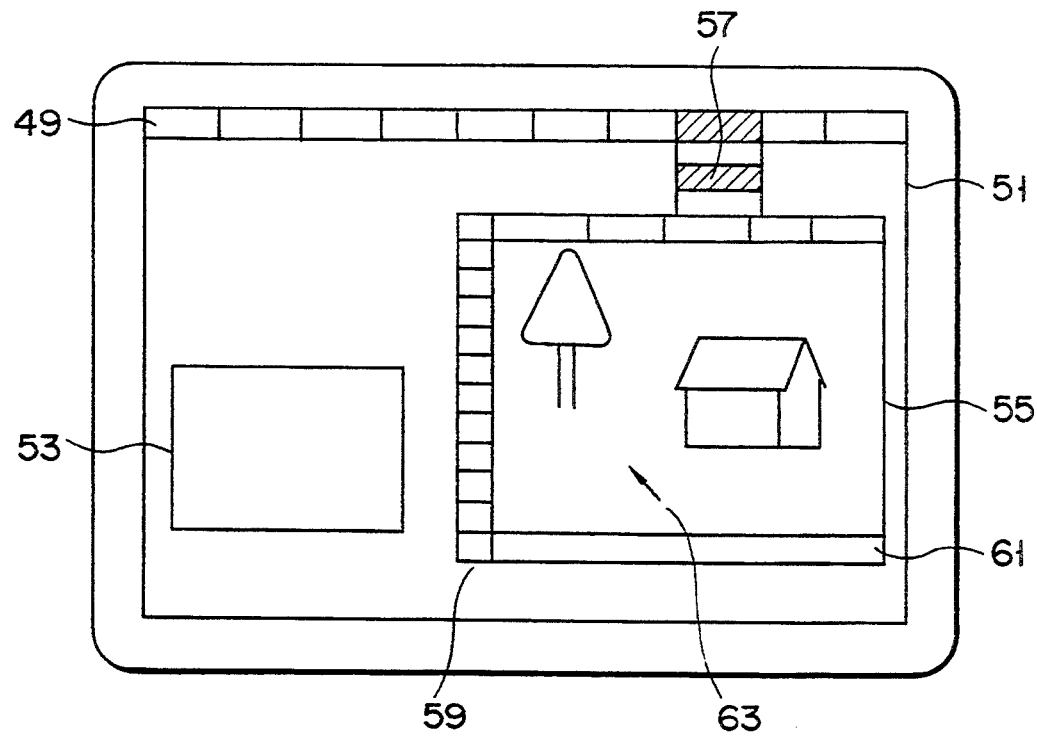
FIG. 7 is a view showing a display screen for executing image editing.

When the menu 49 is selected to obtain a state in which image editing is executable, the display screen is set, as shown in FIG. 7. The target area 53 for displaying a target image (processing result) obtained by image edit processing and a window 55 for displaying an original image including an image to be displayed in the target area 53 as a processing object are formed in the document creation window 51 on the image edit screen shown in FIG. 7. An image selected from detailed data upon selection of a pull-down menu 57 displayed upon selection of image editing with an operation of the mouse 33 is displayed in the window 55. A large number of icons 59 for selecting functions which are not directly associated with image operations (e.g., circle drawing) such as image move processing, image rotation processing, image enlargement/reduction processing, and deforming processing, and a message area 61 for displaying a message such as a description of an image operation are also formed in the window 55. A mouse cursor 63 corresponding to an operation of the mouse 33 is moved and controlled within the window 55 (including an area in which the icons 59 are displayed). In this embodiment, an icon indicates a pictogram showing a processing content.

Figure 8:
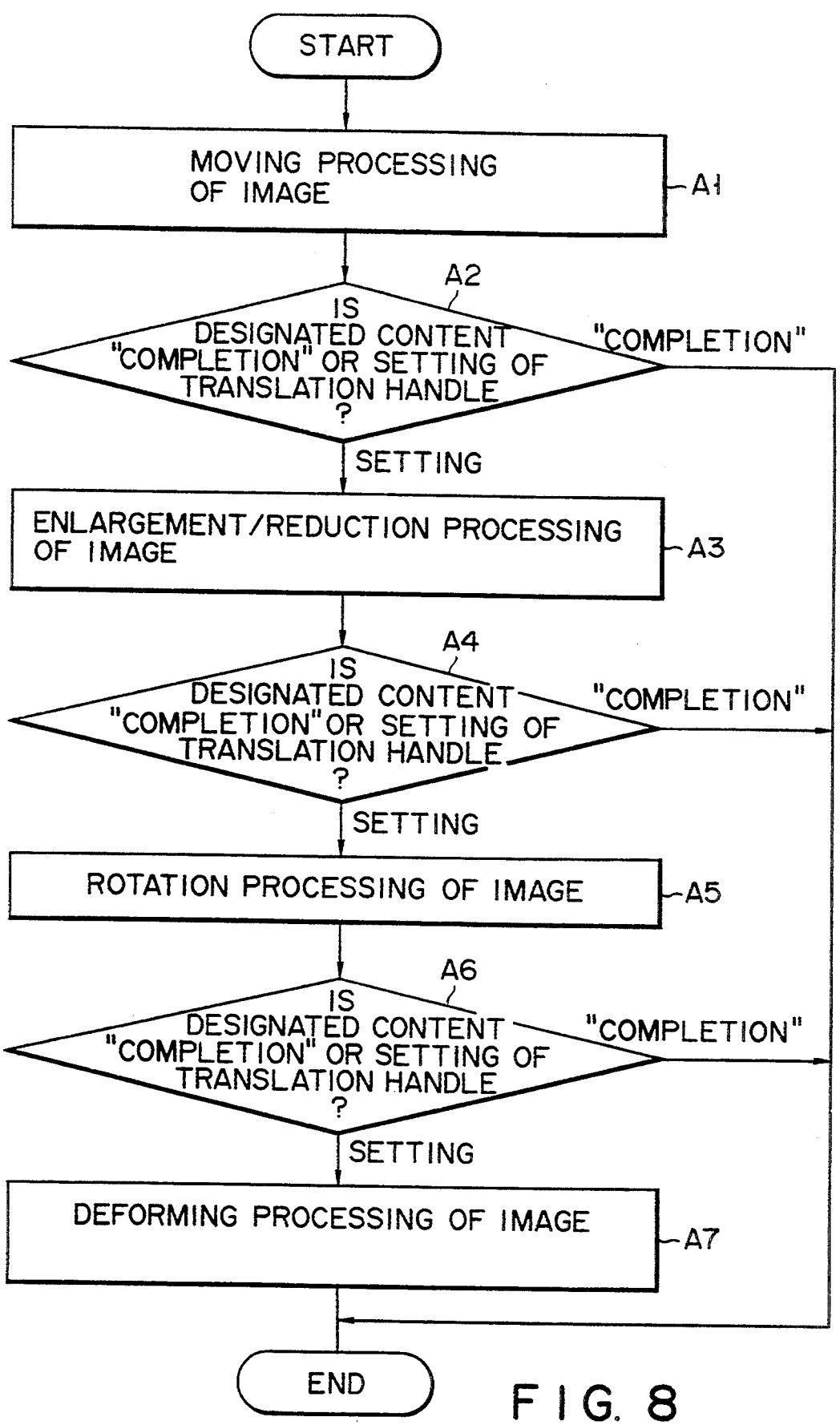
FIG. 8 is a flow chart showing a sequence of image editing.

In order to perform image operations (move, rotation, enlargement/reduction, and deforming) for an image displayed in the window 55, the "image edit" item in the main menu is selected to evoke the image operation function. A flow chart of a processing sequence of this image operation function is shown in FIG. 8. The image operation function is defined to execute a series of operations, i.e., move processing (step A1), enlargement/reduction processing (step A3), rotation processing (step A5), and deforming processing (step A7). The flow sequentially continues to complicated operations. Whether the flow continues to the next processing step or not is determined in accordance with occurrence of one of the two events, i.e., in accordance with whether "completion" of the processing is designated or a frame corner not assigned with a translation handle (to be described later) is dragged and assignment of a new translation handle is designated (steps A2, A4, and A6).

Figure 9:
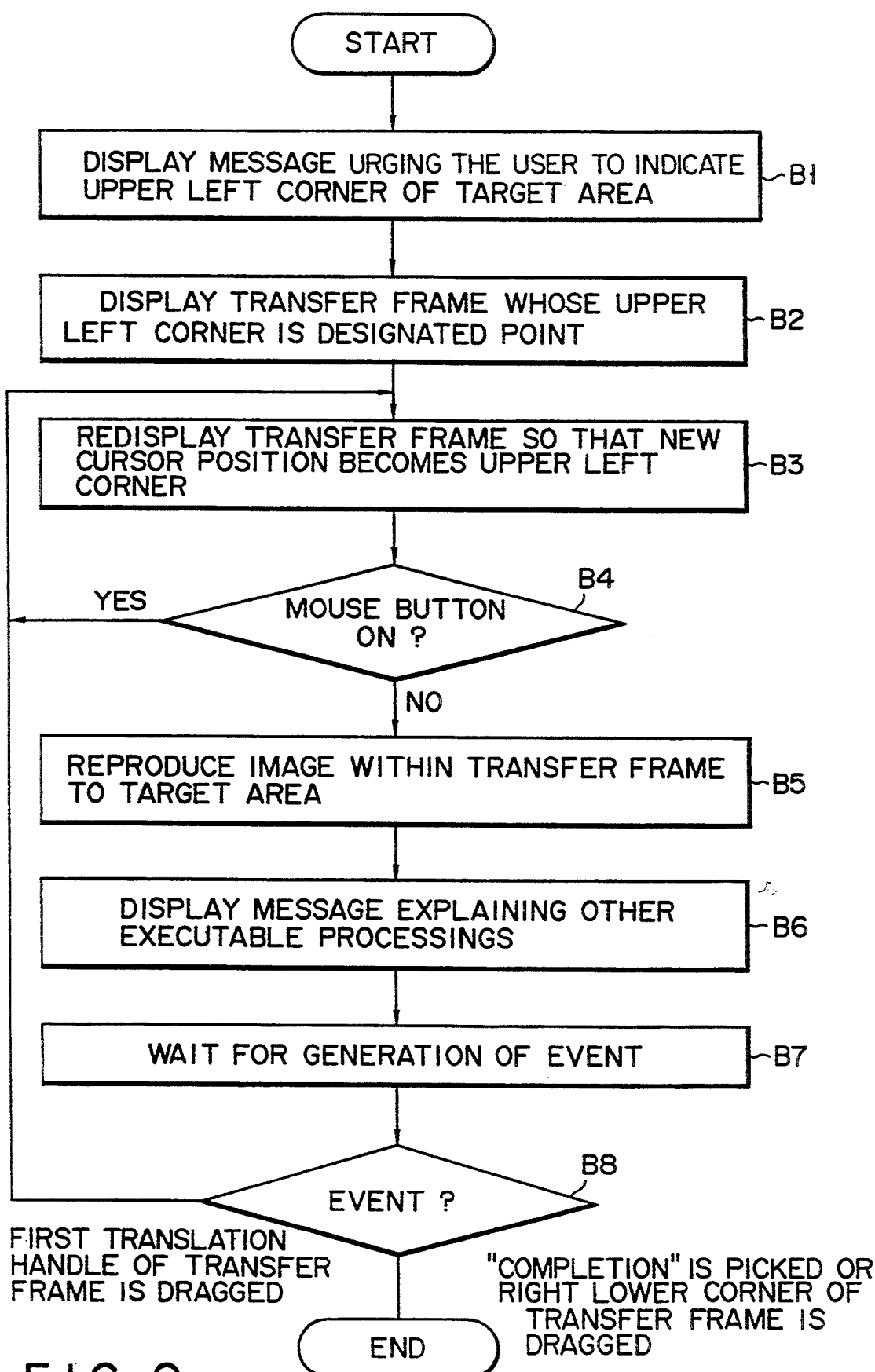
FIG. 9 is a flow chart showing a move processing sequence.

When the image operation function is evoked, the move processing is immediately executed. A flow chart of the move processing (step A1) is shown in FIG. 9.

Figure 10:
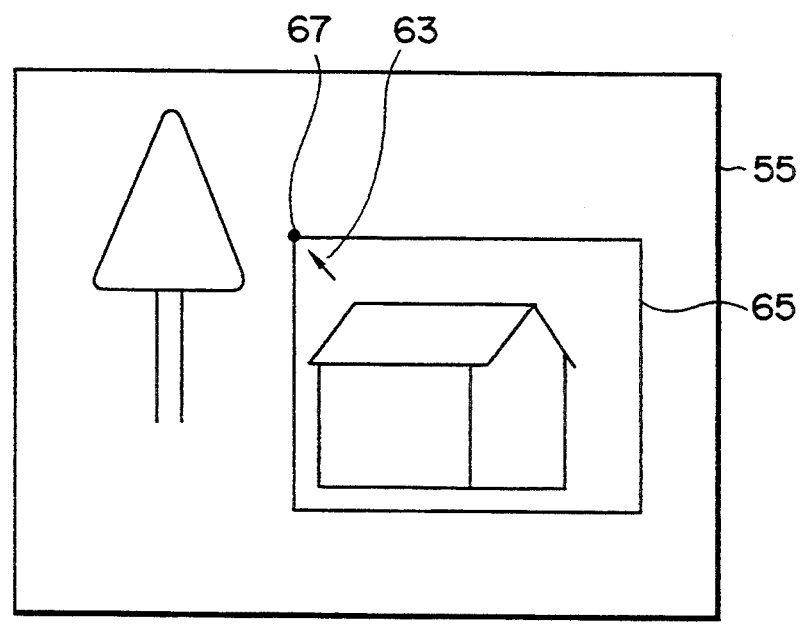
FIG. 10 is a view showing a display screen for executing move processing.

When the image operation is evoked, a message urging the user to indicate the upper left corner of the target area is displayed in the message area 61 in the display screen of the CRT display 47 (step B1). When the mouse cursor 63 is arbitrarily moved and a desired position is picked, a transfer frame 65 is displayed inside the window 55, as shown in FIG. 10 (step B2). The transfer frame 65 is a frame having the same size as the target area (destination area) having the position picked by the mouse cursor 63 as the upper left corner. The two pairs of sides of the transfer frame 65 are set to be horizontal and vertical, respectively. One translation handle (to be referred to as the first translation handle hereinafter) 67 is set in the transfer frame 65 at a position (i.e., the upper left corner of the transfer frame 65) picked by the mouse cursor 63 (this position is indicated by a black dot in FIG. 10). At this time, when the mouse button is kept depressed and the position of the mouse cursor 63 is shifted (this operation will be called dragging hereinafter), the first translation handle 67 is moved in accordance with the mouse cursor 63, and the transfer frame 65 is redisplayed so that the new cursor position becomes the upper left corner (steps B3 and B4). When the mouse button is released in this state, the position of the transfer frame 65 is determined. An image displayed inside the transfer frame 65 is copied and is displayed inside the target area 53 (step B5). In a state wherein the transfer frame 65 is set, a message explaining other executable processings such as "Resetting: drag the upper left corner, Enlargement/reduction etc.: drag the lower right corner" is displayed in the message area 61 (step B6). When an image move is completed, an event is awaited (in this case, the number of events is three, i.e., whether the first translation handle of the transfer frame is dragged, whether completion of the icon 59 is picked, and whether the lower right corner of the transfer frame is dragged) (step B7).

When an event representing dragging of the first translation handle 67 of the transfer frame 65 is detected (step B8), the flow returns to processing in step B3. In this step, resetting of the transfer frame 65 (including the first translation handle 67) is performed, and image move processing is performed at a position of the new transfer frame 65 (step B5). In step B8, when an event of picking "completion" of the icon 59 is detected, the display in the window 55 is deleted, and the image operation function is completed (step A2). In step B8, when the user is not satisfied with an image displayed in the target area 53 and an event of dragging the lower right corner of the transfer frame 65 is detected, it is determined that a shift to enlargement/reduction is designated.

Figure 11:
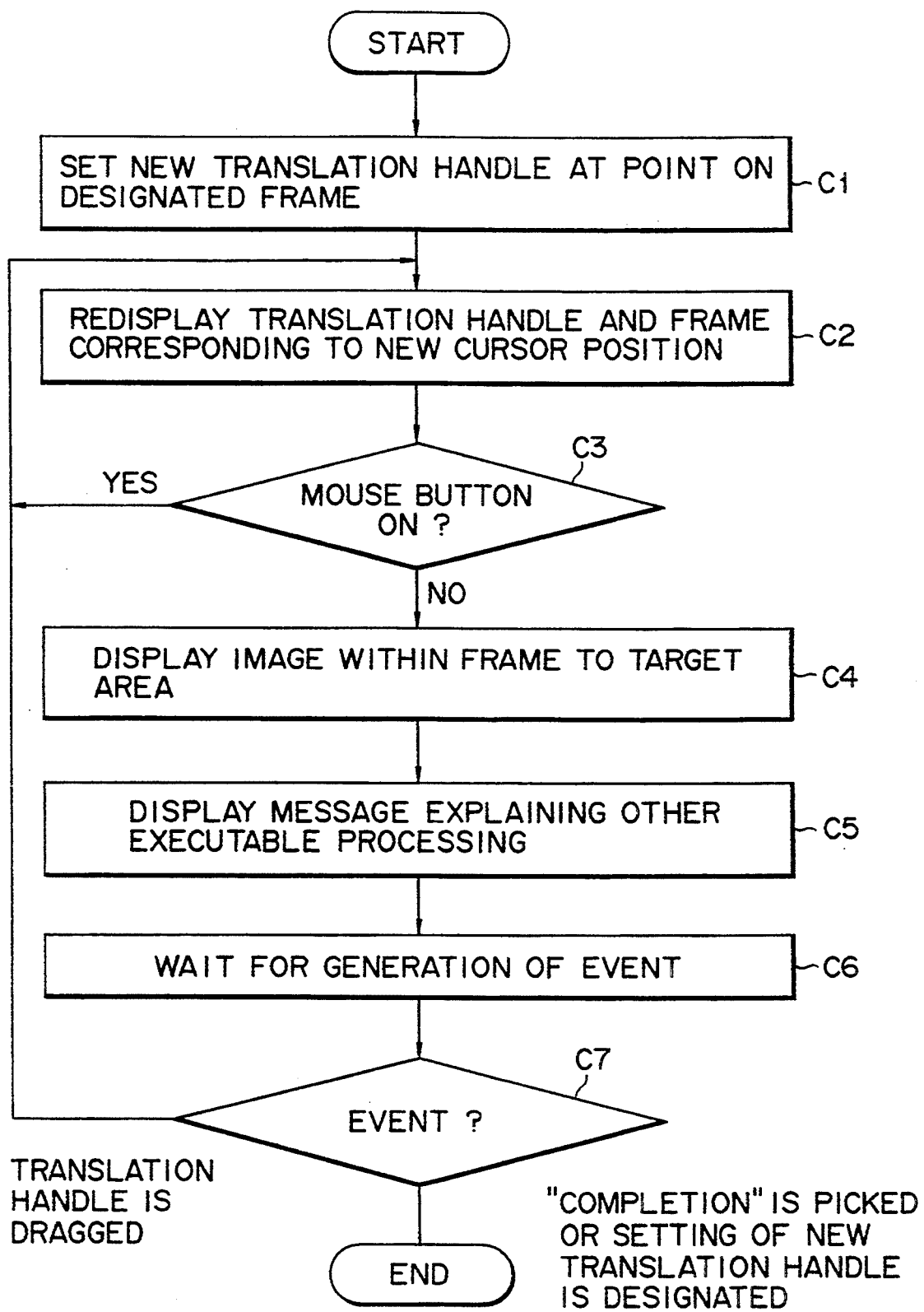
FIG. 11 is a flow chart showing the enlargement/reduction processing, rotation processing, and deforming processing shown in FIG. 8.
Figure 12:
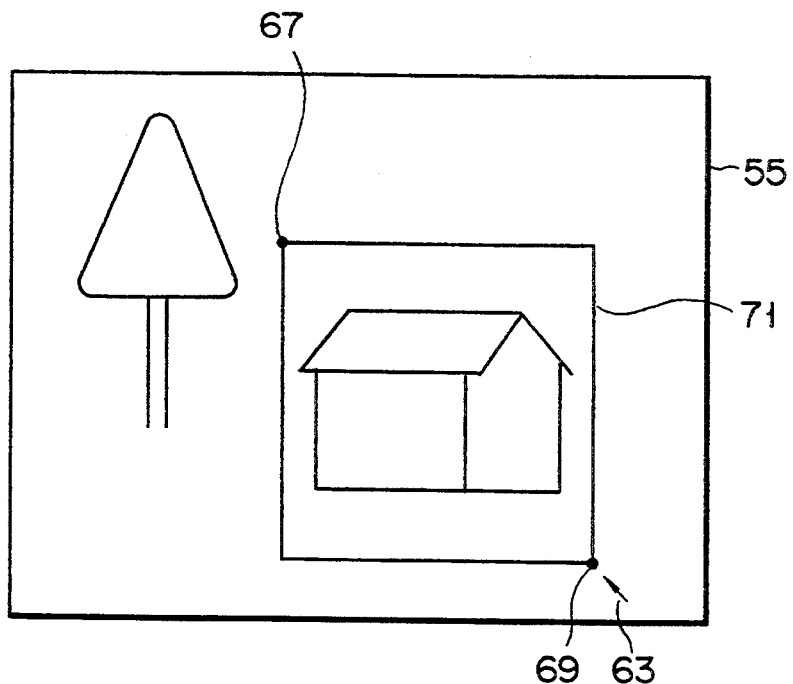
FIG. 12 is a view showing a display screen for executing enlargement/reduction processing shown in FIG. 11.

FIG. 11 is a flow chart of enlargement/reduction processing. When a transition to the enlargement/reduction processing (step A3) is designated, the new second translation handle is set at the lower right corner designated with the mouse cursor 63, and enlargement/reduction of the image is set to be executable (step C1). A display of the display screen in the window 55 in which enlargement/reduction processing is executable is shown in FIG. 12. A frame set by the first and second translation handles 67 and 69 set at the upper left corner and the lower right corner in FIG. 12 is called an enlargement/reduction frame 71. Two pairs of sides of the enlargement/reduction frame 71 are horizontal and vertical as in the transfer frame 65, but the frame size is changed in accordance with dragging of the position of the second translation handle 69. More specifically, when the second translation handle 69 is to be set at the lower right corner, if the second translation handle 69 is kept dragged, the second translation handle 69 is moved in accordance with the mouse cursor. The enlargement/reduction frame 71 is then redisplayed so that the new mouse cursor 63 is located at the lower right corner (steps C2 and C3).

At this time, the position of the first translation handle 67 is not moved, but the sizes of the horizontal and vertical sides are changed. When the mouse button is released, the position of the enlargement/reduction frame 71 is determined, and enlargement/reduction of the image is performed. That is, the image displayed inside the enlargement/reduction frame 71 is enlarged/reduced independently in the horizontal and vertical direction in accordance with the size of the enlargement/reduction frame 71 so as to fit in the target area 53. The enlarged/reduced image is then displayed in the target area 53 (step C4). A message explaining other executable processings "Resetting: drag the translation handle, rotation etc.: drag the lower left corner" is displayed in the message area 61 (step C5). When the image enlargement/reduction processing is completed, the apparatus waits for an event (step C6). In this case, when one of the first and second translation handles 67 and 69 of the enlargement/reduction frame 71 is dragged (step C7), the enlargement/reduction frame 71 is deformed in accordance with the positions of the translation handles (step C2), thereby deforming the image displayed in the target area 53. When the first translation handle 67 is dragged, the frame size is changed to change the image operations (deforming of the target area, and an enlargement/reduction size). A new result is displayed in the target area 53 when the dragged mouse button is released. As shown in FIG. 12, the first and second translation handles 67 and 69 designated by the user are formed in the enlargement/reduction frame 71, and this frame is indicated as a rectangular frame by oblique points as the first and second translation handles. That is, the horizontal and vertical sizes can be arbitrarily set by designating one point. Since the processing result is enlarged/reduced and is displayed in the target area 53, an executable state of the enlargement/reduction operation can be relatively easily determined by the frame defined by the first and second translation handles 67 and 69. In step C7, when an event of picking "completion" of the icon 59 occurs, the display in the window 55 is deleted, and the image operation function is completed (step A4). In step C7, when the user is not satisfied with an image displayed in the target area 53, and an event of dragging the lower left corner of the enlargement/reduction frame 71 is determined to be designated.

Figure 13:
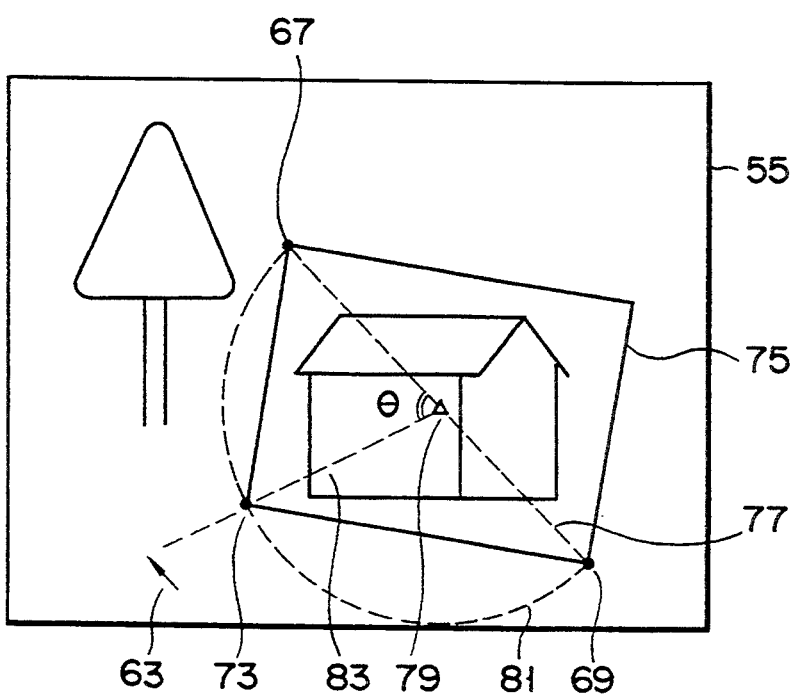

Since a flow chart of rotation processing is performed in substantially the same manner as in the enlargement/reduction processing, the rotation processing will be described with reference to the flow chart in FIG. 11. When a transition to rotation processing (step A5) is designated, a third translation handle 73 is set at the lower left corner designated with the mouse cursor 63, so that the image is rotatable. A display screen in the window 55 in a rotatable state is shown in FIG. 13. As shown in FIG. 13, a frame set by first, second, and third handles 67, 69, and 73 set at the upper left corner, the lower right corner, and the lower left corner is called a rotation frame 75. When the third translation handle 73 is dragged, only the position of the third translation handle 73 is changed while the positions of the first and second translation handles 67 and 69 are kept unchanged in the rotation frame 75. In this case, the rotation frame 75 is set to keep a rectangular shape whose adjacent sides are perpendicular to each other. More specifically, the third translation handle 73 is controlled so as to move along an arc 81 having as the center a middle point 79 of a line segment (diagonal line) 77 connecting the first and second translation handles 67 and 69 and passing through the first and second translation handles 67 and 69. The third translation handle 73 is not freely moved with respect to the mouse cursor 63. As shown in FIG. 13, the third translation handle 73 is set at an intersection between the arc 81 and a line 83 connecting the mouse cursor 63 and the middle point 79. The line segment 77, the middle point 79, the arc 81, and the line 83 are not displayed in the screen. When the third translation handle 73 is to be set at the lower left corner, if the third translation handle 73 is kept dragged, the position of the third translation handle 73 is changed in correspondence with the mouse cursor 63, and the rotation frame 75 is redisplayed. On the other hand, when the mouse button is released, the position of the rotation frame 75 is determined, and the image is enlarged/reduced and rotated. That is, the image displayed inside the rotation frame 75 is enlarged/reduced to fit in the target area 53 in accordance with the size of the rotation frame 75, the enlarged/reduced image is rotated in accordance with an inclination angle of the rotation frame 75, and the obtained image is displayed in the target area 53. A message such as "Resetting: drag the translation handle, Deforming: drag the upper right corner" for other executable processings is displayed in the message area 61. When image rotation processing is completed, the apparatus waits for an event. When one of the first, second, and third translation handles 67, 69, and 73 of the rotation frame 75 is dragged, the rotation frame 75 is reset in accordance with the processing and position corresponding to the translation handle, and an image displayed in the target area 53 is changed. When the third translation handle 73 of the rotation frame 75 is reset, control is performed as described above. When the position of the first or second translation handle 67 or 69 is reset, the following control is performed. When one of the first and second translation handles is dragged, the position of the dragged translation handle at the other end of the line segment (diagonal line) 77 is kept fixed, but the arc 81 is changed in accordance with the positions of the line segment 77 and the middle point 79 so as to correspond to movement of the mouse cursor 63. The third translation handle 73 is reset to a position so that an angle (i.e., an angle between the first and third translation handles 67 and 73 with respect to the middle point 79) shown in FIG. 13 is not changed on a new arc 81.

FIG. 14 shows a case wherein the rotation frame 75 is modified so that the right side becomes an upper side.

More specifically, a predetermined frame change is performed in accordance with a translation handle to be dragged (the first translation handle is associated with a frame move, and the second translation handle is associated with frame enlargement/reduction), and an image operation is performed. A new result is displayed in the target area 53 upon release of the dragging mouse button. When an event of picking "completion" of the icon 59 occurs, a display of the window 55 is deleted, and the image operation function is canceled (step A6). When an event of dragging the upper right corner of the rotation frame 75 occurs, it is determined that a transition to image deforming processing is designated.

Since a sequence of deforming processing is almost the same as that of enlargement/reduction processing, the deforming processing sequence will be described with reference to the flow chart in FIG. 11. When a transition to deforming processing (step A7) is designated, a fourth translation handle 85 is set at the upper right corner designated with the mouse cursor 63, and an image deformable state is obtained. A display screen in the image deformable state is shown in FIG. 15. As shown in FIG. 15, a frame set by four translation handles 67, 69, 73, and 85 is called a deforming frame 87. When the fourth translation handle 85 is kept dragged, the deforming frame 87 is moved in accordance with the position of the mouse cursor 63. When the mouse button is released, the position of each translation handle is determined and displayed. When the four translation handles 67, 69, 73, and 85 are set, they can be dragged and moved to arbitrary positions. That is, the directions of the sides of the deforming frame 87 and their angles have no limitations. When the position of the deforming frame 87 is determined, deforming (image enlargement/reduction or rotation) is performed in accordance with the shape of the deforming frame 87 so that an image inside the deforming frame 87 is fitted in the target area 53. The resultant image is displayed in the target area 53 (FIG. 15). A message such as "Resetting: drag the translation handle" for explaining other executable processings is displayed in the message area 61. When an image displayed in the target area 53 is satisfactory and an event of picking "completion" of the icon 59 occurs, the display in the window 55 is deleted to cancel the image operation function. When any translation handle is dragged, the shape of the deforming frame is changed in accordance with designation with the mouse cursor 63, and the image displayed in the target area 53 is deformed.

Generation of the first to fourth translation handles and various operations such as image move, enlargement/reduction, rotation, and deforming operations can be systematically designated with simple operations of position designation operations. The processing contents (move, enlargement/reduction, rotation, and deforming) of the currently performed image operation can be easily determined in accordance with the frame shape in the window 55 in which an original image is displayed and with the number of translation handles added to the frame. Processing continues to more complicated processing by a series of procedures having a smaller number of steps in an operation of simpler processing which is performed more often. That is, when a result obtained by using simple functions is not satisfactory and an image is to be operated on by more complicated functions, a transition can be achieved by simple designation of translation handles.

In this embodiment, the translation handles are designated in an order of the upper left corner, the lower right corner, the lower left corner, and the upper right corner of the frame. This order and the corresponding functions are not limited to specific ones.

In this embodiment, the sequences of enlargement/reduction processing, rotation processing, and deforming processing have been described with reference to the flow chart of FIG. 11. In step C4, however, processing corresponding to the designated function and the set states of the translation handles is executed.

A method of performing geometric conversion (rotation processing) including rotation for displaying an image in the rotation frame 75 in the window 55 designated with this man-machine interface in the target area 53 will be described below.

FIG. 16 shows a position of the rotation frame 75 by original image coordinates. Assume that the fourth vertex (upper right corner point) of the rotation frame 75 is defined as PD, and that coordinates of the vertices PA to PD are defined as (XA,YA), . . . , (XD,YD). FIG. 17 shows the target area 53 in a document. In this embodiment, original image data is stored in the main memory 13 and is also copied in the VRAM 43 for displaying the original image in the window 55 of the CRT display 47. The image data to be displayed in the target area 53 may be stored in a memory for storing this content. For the sake of simplicity, the image data may be partially stored in the VRAM 43 in favor of a display advantage (this memory allocation is not essential. In order to store the original image, a portion of the VRAM 43 which is not currently used may be used in place of the main memory 13, and a portion of which VRAM 43 which corresponds to the window 55 may be used).

FIG. 16 shows part of the content stored in the main memory 13, and FIG. 17 shows a two-dimensional coordinate system of the VRAM 43. Each data in each memory is stored in the form of, e.g., 8-bit data.

The point PA in FIG. 16 is mapped on the upper left corner of the target area as target partial geometric conversion. This indicates that a density NS(XA,YA) stored in the coordinates (XA,YA) is set as a density ND(0,0) of a point (0,0) shown in FIG. 17.

Figure 20A:
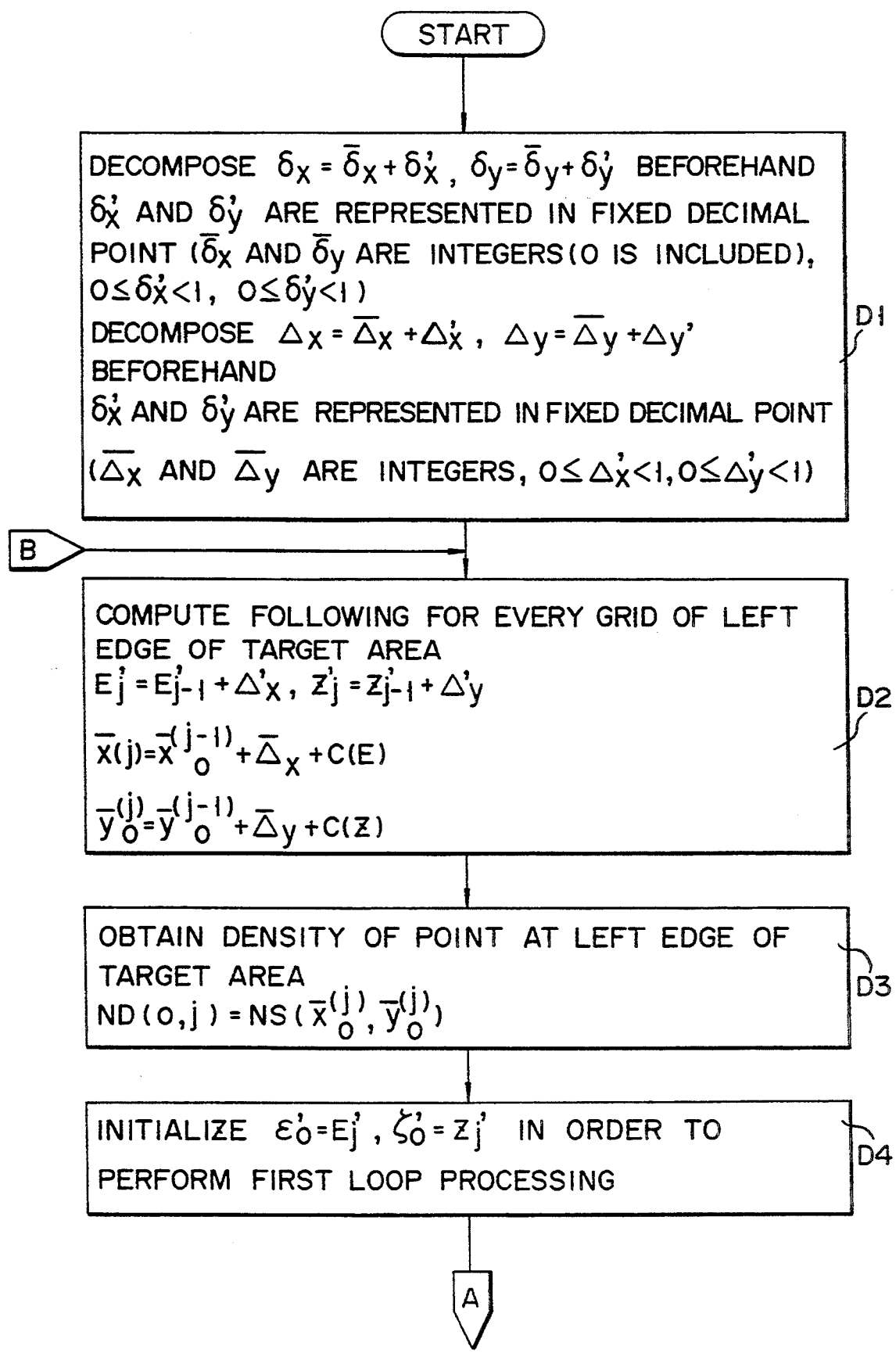
FIGS. 20A and 20B are flow charts showing detailed sequences of enlargement/reduction processing and rotation processing.
Figure 20B:
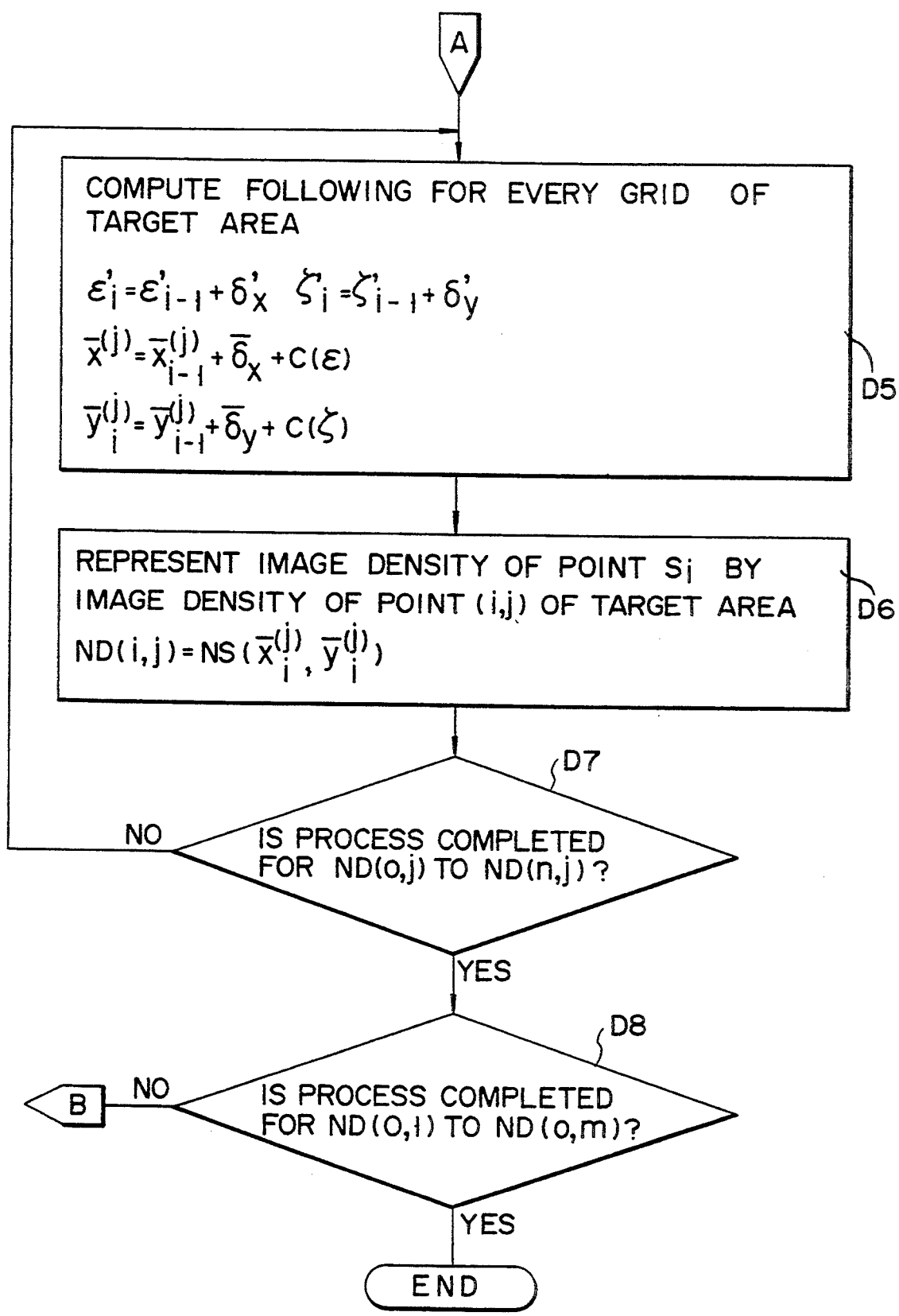

The density ND(i,j) is obtained according to a nearest neighbor method as follows. As shown in FIG. 17, a coordinate grid of the target area is inverse-mapped, and the density of the coordinate grid point (point Si in FIG. 17) of the original image nearest to the mapped grid is set to be a density ND(i,j). Processing starts from a state wherein a point $S_{i-1}$ corresponding to ND(i−1,j) is determined, and then Si is obtained (a method of obtaining a start point will be described later). This method is realized by an addition instruction without using multiplication and division calculations within the innermost program loop. Image conversion sequences are shown in FIGS. 20A and 20B.

If the inverse-mapped coordinates of two points corresponding to densities ND(i−1,j) and ND(i,j) are defined as follows:

$$(X^{(i)}_{i-1}, Y^{(i)}_{i-1}), (X^{(i)}_{i}, Y^{(i)}_{i})$$

(these coordinate values are real numbers), the following values are constants (real values) regardless of values $i$ and $jj$:

$$\delta_x = X^{(i)}_i - \overline{X}^{(i)}_{i-1}$$

$$\delta_y = Y^{(j)}{}_i - \overline{Y}^{(j)}{}_{i-1}$$

The coordinates of a point $S_{i-1}$ are given as follows:

$$(\overline{X}^{(j)}{}_{i-1}, \overline{Y}^{(j)}{}_{i-1})$$

and two orthogonal difference vectors $\epsilon_{i-1}$ and $\xi_{i-1}$ are defined as follows:

$$\epsilon_{i-1} = X^{(j)}{}_{i-1} - \overline{X}^{(j)}{}_{i-1}$$

$$\xi_{i-1} = Y^{(j)}{}_{i-1} - \overline{Y}^{(j)}{}_{i-1}$$

then integral values $\overline{X}^{(j)}{}_{i-1}$ and $\overline{Y}^{(j)}{}_{i-1}$ are selected to satisfy conditions $-\frac{1}{2} \leq \epsilon_{i-1} < \frac{1}{2}$ and $-\frac{1}{2} \leq \xi_{i-1} < \frac{1}{2}$, inverse-mapped coordinates $(X^{(j)}{}_i, Y^{(j)}{}_i)$ for ND(i,j) are obtained using the following equations:

$$X^{(j)}{}_i = \overline{X}^{(j)}{}_{i-1} + \epsilon_{i-1} + \delta_x$$

$$Y^{(j)}{}_i = \overline{Y}^{(j)}{}_{i-1} + \xi_{i-1} + \delta_x$$

and a grid point $(\overline{X}^{(j)}, \overline{Y}^{(j)})$ ($\overline{X}^{(j)}, \overline{Y}^{(j)}$ are integers) close to this coordinate point is defined as $S_i$.

According to the present invention, the above processing is performed as follows (the innermost loop (i.e., the first loop, that is, one-line image conversion processing) of the flow charts in FIGS. 20A and 20B is constituted by steps D5 through D7, and the second loop (image conversion processing of several lines of the transfer frame) is constituted by steps D2 through D8). Note that a method of deriving data given prior to processing will be described later.

(i) The differences $\delta x$ and $\delta y$ of the coordinate values in the first and second coordinate axis directions are decomposed as $\delta x = \overline{\delta} x + \delta'_x$ and $\delta y = \overline{\delta} y + \delta'_y$ (where $\overline{\delta} x$ and $\overline{\delta} y$ are integers (they may be zeros), i.e., $0 \leq \delta'_x < 1$ and $0 \leq \delta'_y < 1$), and the values $\delta'_x$ and $\delta'_y$ are displayed with fixed decimal points (step D1). This is preparation for the first loop. Since the first result can be retained, it is calculated beforehand.

(ii) The following calculations are performed in units of grid points of the target areas (step D5):

$$\epsilon'_i = \epsilon'_{i-1} + \delta'_x, \quad \xi'_i = \xi'_{1-i} + \delta'_y$$

$$\overline{X}^{(j)}{}_i = \overline{X}^{(j)}{}_{i-1} + \overline{\delta}_x + C(\epsilon)$$

$$\overline{Y}^{(j)}{}_i = \overline{Y}^{(j)}{}_{i-1} + \overline{\delta}_y + C(\xi)$$

(iii) An image density of the point $S_i$ obtained in the procedure (ii) is set to be an image density of the point $(i,j)$ of the target area (step D6).

$$ND(i, j) = NS(\overline{X}^{(j)}{}_i, \overline{Y}^{(j)}{}_i)$$

The procedures (ii) and (iii) (steps D5 and D6) are repeated from ND (1, j) to ND (n, j) (step S7).

In this case, $\epsilon'_i$ and $\xi'_i$ are fixed decimal point displays for expressing values of $\epsilon_i + \frac{1}{2}$ and $\xi_i + \frac{1}{2}$ (both are 0 or more and less than 1). Each of $c(\epsilon)$ and $c(\xi)$ represents 1 when a carry is produced in a calculation result of the immediately preceding one of $\epsilon'_i$ and $\xi'_i$, i.e., when the calculation result exceeds 1, and represents 0 when no carry is produced. Additions including $c(\epsilon)$ and $c(\xi)$ are realized by an instruction, e.g., "Add With Carry" in many general-purpose microprocessors.

A method of obtaining an inverse-mapped result of ND(0,j), i.e., a method of obtaining the start point of the above procedures, that is, the second loop, will be described below.

As shown in FIG. 19, the inverse-mapped differences $\Delta x$ and $\Delta y$ (both are real numbers) are constant regardless of the value j and can be realized by the fixed decimal point addition instruction without using the multiplication and division calculations in the same manner as described above. More specifically, (i) $\Delta x = \overline{\Delta} x + \Delta'x$ and $\Delta y = \overline{\Delta} y + \Delta'y$ (where $\overline{\Delta} x$ and $\Delta y$ are integers, provided that $0 < \Delta x < 1$ and $0 < \Delta y < 1$) are obtained so that $\Delta'x$ and $\Delta'y$ are displayed with fixed decimal points (step D1). This is preparation for the second loop. Once these values are obtained, they can be retained, so that they are calculated beforehand.

(ii) The following calculations are performed in units of left end grid points of the target areas (step D2).

$$E'_j = E'_{j-1} + \Delta X, \quad Z'_j = Z'_{j-1} + \Delta Y$$

$$\overline{X}^{(j)}{}_0 = \overline{X}^{(j-1)}{}_0 + \overline{\Delta} X + C(E)$$

$$\overline{Y}^{(j)}{}_0 = \overline{Y}^{(j-1)}{}_0 + \overline{\Delta} Y + C(Z)$$

(iii) The density of the left end point of the target area is obtained (step D3) as follows:

$$ND(0,j) = NS(\overline{X}^{(j)}{}_0, \overline{Y}^{(j)}{}_0)$$

(iv) In order to perform the first loop processing, $\epsilon'_0$ and $\xi'_0$ are initialized as $\epsilon'_0 = E'_j$ and $\xi'_0 = Z'_j$ (step D4).

The procedures for ND (i, j) to ND (n, j) of the first group are performed.

The processing of the operations (ii) through (iv) is repeated from ND(0,1) to ND(0,m) (step DS).

$E'_j$ and $Z'_j$ are fixed decimal points representing values of $E_j + \frac{1}{2}$ and $Z_j + \frac{1}{2}$, and each of $c(E)$ and $c(Z)$ is 1 when a carry is produced in each of the E' and Z' calculations, but is 0 when no carry is produced.

In this manner, the second inner loop of the program can be constituted without including the multiplication and division calculations.

Finally, a method of deriving data for performing the above procedures from a size (n,m) of the target area and coordinates (XA,YA), (XB,YB), and (XC,YC) of three points PA, PB, and PC in FIG. 16 will be described below.

When the coordinates of the fourth corner of the inverse-mapped frame is given as (XD,YD), since the inverse-mapped frame has a rectangular shape, the x- and y-coordinates are given as follows:

$$XD = XA + XB - XC$$

$$YD = YA + YB - YC$$

therefore $$\delta x = (XD - XA)/n$$
$$= (XB - XC)/n$$
$$\delta y = (YD - YA)/n$$
$$= (YB - YC)/n$$
$$\Delta x = (XC - XA)/m$$
$$\Delta y = (YC - YA)/m$$

In this manner, the values are calculated for one image once and are decomposed and expressed as in operations (i) and (1) above.

Each of $E'_0$ and $Z'_0$ has $\frac{1}{2}$ as its initial value and, $X^{(0)}_0 = XA$ and $y^{(0)}_0 = YA$ are given.

The second group is executed from 0 to $\bar{m}$. (In this case, in the first loop, since $x^{(0)}_0$ and $j^{(0)}_0$ are obtained for $j=0$, the operation (2) is not executed, but processing is started from the operation (3)).

In this manner, even if image conversion is performed by enlargement/reduction and rotation, these processing operations need not be independently designated with an enlargement/reduction factor and a rotation angle, thereby simplifying the operation.

Conversion for enlargement/reduction and rotation is performed by one processing without including a branch instruction and multiplication and division calculations on the basis of the designated target area and the designated conversion frame (e.g., the rotation frame 75). Therefore, high-speed processing can be performed as compared with a combination of enlargement/reduction processing and rotation processing. In particular, when pipeline processing is applied, no disturbance is imposed on the pipelines since no branch instructions are included in the program loop, thereby further increasing the processing speed. In addition, since no special hardware is required, the apparatus can be manufactured at low cost, thus improving versatility.

Figure 21:
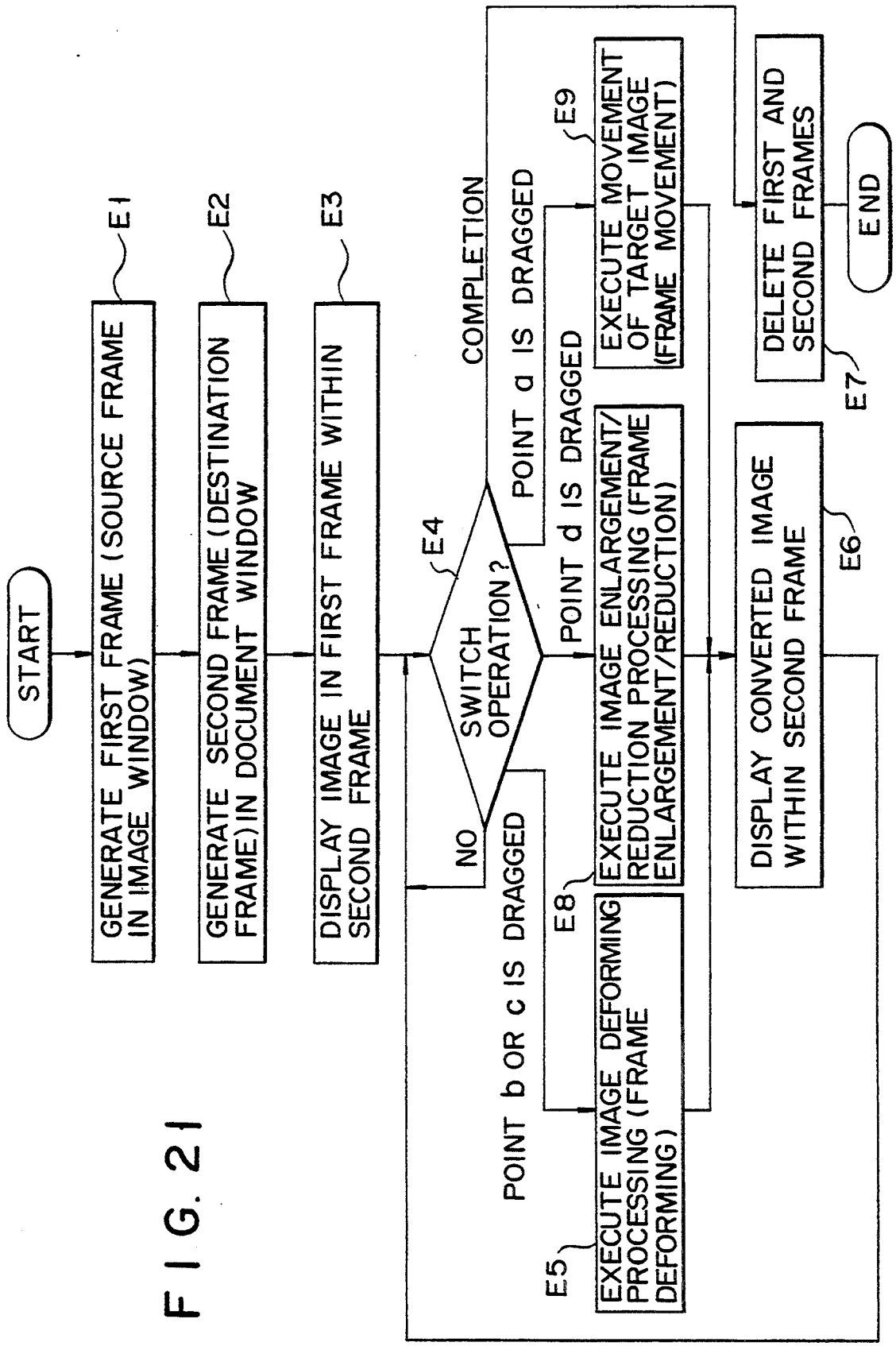
FIG. 21 is a flow chart showing another embodiment of the present invention.

Another embodiment of the present invention will be described with reference to FIG. 22 and to a flow chart in FIG. 21. In this embodiment, a first frame 117 is set in an image window 111. A second frame 119 is set in a document window 113. The image in the first frame is displayed in the second frame, and deforming processing, enlargement/reduction processing, and move processing are performed in correspondence with dragging of each point of the first frame. In this embodiment, a rectangular frame (i.e., the first frame 117) for specifying an image as an edit object set in the image window 111 can be arbitrarily converted.

When the image edit function is selected from the main menu, the CPU 11 performs processing for setting the first frame 117 in the image window 111 (step E1). The first frame 117 is designated by dragging so as to indicate the start point (i.e., the upper left vertex of the rectangular frame) and the end point (i.e., the lower right vertex of the rectangular frame) of the first frame upon operation of the pointing device such as the mouse 33. At positions representing the designated start and end points of the first frame 117, the CPU 11 sets the first frame formed by horizontal and vertical straight lines in the image window 111. A display screen of the CRT display 47 in a state wherein the first frame 117 is set in the image window 111 is shown in FIG. 22. In this embodiment, the upper left, upper right, lower left, and lower right vertices (the points of edge) are defined as points $\underline{a}$, $\underline{b}$, $\underline{c}$, and $\underline{d}$, respectively.

When the first frame 117 is set in the image window 111, the CPU 11 performs processing for setting, in the document window 113, a rectangular frame (the second frame 119) for designating an area for displaying the image of the first frame upon edit processing (step E2). The position of the second frame is set by moving the cursor 63 in the document window 113 and picking a point at an arbitrary position. That is, the frame having the same shape as that of the first frame 117 having the picked position as the upper left position is set in the document window 113 as the second frame 119. When the second frame 119 is set, the CPU 11 causes the CRT display 47 to display the image within the first frame in the second frame (step E3). A display screen in a state wherein the image is displayed within the second frame is shown in FIG. 23. Since the shape of the first frame is identical to that of the second frame, the images displayed within these frames are identical to each other.

When the first and second frames are set, image processing derived from the image edit function can be arbitrarily selected. That is, any one of the points $\underline{a}$ through $\underline{d}/0$ is picked/dragged to perform processing corresponding to the designated point. The content of processing upon dragging of any one of the points $\underline{a}$ through $\underline{d}$ will be described below.

In a wait state during operation of the mouse 33 by a user (step E4), when the point $\underline{b}$ or $\underline{c}$ of the first frame is dragged, the CPU 11 determines deforming processing (step E5). In this case, the position of the point $\underline{b}$ or $\underline{c}$ is moved to an arbitrary position upon dragging. More specifically, when the point $\underline{b}$ or $\underline{c}$ is dragged, the CPU 11 changes the position of one vertex while the positions of the remaining three vertices are kept stationary, thereby deforming the first frame in accordance with movement of the position of this point. A deformed first frame is shown in FIG. 24. More specifically, the position of the point $\underline{c}$ is moved to deform the shape of the first frame. Note that a middle point c-1 and a point c-2 in FIG. 24 represent vertices before and after dragging. When the position of the point $\underline{b}$ or $\underline{c}$ is determined to set the first frame 117, the CPU 11 performs image conversion so that the image within the deformed first frame 117 is just fitted in the second frame 119. The CPU 11 displays the converted image within the second frame 119 in the display screen of the CRT display 47. A display screen in which the converted image is displayed within the second frame 119 is shown in FIG. 25.

When the shape of the first frame 117 is to be changed, the CPU 11 preferably operates as follows. While the position of one vertex may be kept stationary, the position of another designated vertex may be moved and the positions of the remaining two vertices may be moved so as to keep an angle formed by the lines of the frame unchanged. Alternatively, the position of one designated vertex is moved and the positions of other three vertices are moved so as to keep the shape and size of the frame unchanged, thereby changing the first frame 117.

When the image is displayed within the second frame 119, the CPU 11 returns to processing of step E4 and waits for the next operation of the switch. When the "completion" item is selected from the menu shown in FIG. 25, the CPU 11 deletes the first frame 117 and the second frame 119, and image edit processing is completed. A display screen in a state wherein the image is inserted in the document window upon completion of the image edit processing is shown in FIG. 26.

When the "completion" item is not selected in step E4, this image edit processing is continued.

When the point d of the first frame is dragged, the CPU 11 determines enlargement/reduction processing. In this case, as in the deforming processing, the position of the point d is moved to an arbitrary position upon dragging. That is, when the point d is dragged, the shape of the first frame 117 is deformed by changing the lengths of the sides without changing angles formed by the sides while the position of the point a is kept unchanged under the control of the CPU 11. An example of the deformed first frame 117 is shown in FIG. 27. FIG. 27 shows a deformed shape of the first frame 117 by shifting the position of the point d upon dragging. Points d-1 and d-2 in FIG. 27 show vertices before and after dragging. This operation is equivalent to enlargement/reduction of the first frame 117 at magnification factors independently in directions indicated by arrows A and B in FIG. 27. When the position of the point d is determined and the first frame 117 is set, the CPU 11 performs image conversion so as to just fit the image of the set first frame 117 in the second frame 119. The CPU 11 displays the converted image in the second frame 119 in the display screen of the CRT display 47.

When the point a of the first frame 117 is dragged, the CPU 11 determines move processing (step E9). In this case, the point a is moved to an arbitrary position upon dragging. More specifically, when the point a is dragged, the CPU 11 moves the first frame 117 without changing its shape upon movement of the point a. FIG. 28 shows on example wherein the first frame 117 is moved. Referring to FIG. 28, the position of the point a is moved by dragging to move the position of the first frame 117. Note that points a-1 and a-2 in FIG. 28 are vertices before and after dragging. When the position of the point a is determined and the first frame 117 is set, the CPU 11 performs image conversion so that the image in the set first frame 117 is just fitted in the second frame 119. The CPU 11 displays the converted image within the second frame 119 in the display screen of the CRT display 47.

The points a through d of the first frame 117 are arbitrarily dragged to change the first frame 117, thereby changing the image displayed within the second frame 119. This processing can be repeatedly performed until the "completion" item is selected. Therefore, rotation processing of the image is repeatedly performed by arbitrarily setting the positions of the vertex a through the point d of the first frame 117, thereby rotating the first frame 117.

Image conversion is performed so that the image in the first frame 117 is just fitted and displayed within the second frame 119.

A practical conversion method is projection conversion. This technique is a known image conversion technique, as described in Fujio Yamaguchi, "Graphic Processing Engineering by Computer Display", Nikkan Kogyo Shinbun, pp. 91–108, in Kouichiro Deguchi, "Projection Geometry [I] for Computer Vision, Graphics" in "KEISOKU & SEIGYO", Vol. 29, No. 11, November, 1990 and in Kouichiro Deguchi, "Projection Geometry [II] for Computer Vision, Graphics" in "KEISOKU & SEIGYO", Vol. 29, No. 12, December, 1990. In projection conversion, if the coordinates of a given pixel before conversion are (x,y) and the coordinates of the given pixel after conversion are (x',y'), then the coordinates before conversion are converted into those after conversion as follows:

$$x' = (ax+by+c)/(dx+ey+f) \tag{1}$$

$$y' = (gx+hy+i)/(dx+ey+f) \tag{2}$$

In equations (1) and (2), $a$ through $i$ are parameters for determining the conversion method. There are nine parameters, but the numerators and denominators of the right-hand sides of equations (1) and (2) are divided by one parameter to reduce the number of parameters to eight. When coordinate values of four points before and after conversion are determined, conversion parameters are uniquely determined. A substitution of the coordinate values of the four vertices of the conversion source coordinate frame (first frame) and the conversion destination coordinate frame (second frame) into equations (1) and (2) yield parameters.

The image enlargement/reduction, the image move, and the image rotation are special cases in projection conversion. For example, in the above equations, when coefficients $b$, $c$, $d$, $e$, $g$, and $i$ are set to zeroes, and $f$ is set to "1", this setting is equivalent to an operation in which an image is multiplied by $a$ times in the x direction and $h$ times in the y direction by using the origin as the center. In steps E5, E8, and E9, when the conversion source image frame (first frame) is deformed to enlarge/reduce and rotate the conversion destination image frame (second frame), the images can be reduced, enlarged, and rotated (reverse direction) upon execution of processing in step E6.

The present invention, however, is not limited to any specific image conversion method. Any method can be used in place of projection conversion.

In the above processing, as shown in FIG. 25, a desired image is displayed within the first frame 117 in the document window.

The first frame 117 for designating an image as an edit object is always displayed. The first frame is directly deformed by moving the vertices of the frame, and the image is converted accordingly. For this reason, an item name of desired processing need not be taken into consideration, unlike in the conventional system for selecting an arbitrary item from the menu. Even when conversion is repeated in a trial and error, the way of previous conversion can be determined in accordance with the frame shape, and the apparatus can be easily improved. Unlike in the conventional technique wherein the number of operations by the user is increased, conversion operability can be improved. Processing which is rarely repeated in a trial and error, such as completion processing, can be selected from the menu without degrading operability.

In the above embodiment, only the conversion source image frame is deformed. However, the conversion destination image frame (second frame) may be similarly deformed. In this case, the vertices of the conversion destination image are dragged to deform the image and image conversion is performed in accordance with the shapes of both the frames as in deforming processing of the conversion source image frame (first frame).

In the above embodiment, deforming processing is image conversion for changing an aspect ratio in accordance with a dragging direction. In an application, however, image conversion may have to be performed without changing the aspect ratio upon dragging on, e.g., a diagonal line. In this case, for example, a mouse having three buttons is arranged. The first button is assigned to set translation handles, the second button is assigned to delete the translation handles, and the third button is assigned to set a predetermined aspect ratio. When the third button of the mouse is clicked, a mark indicated by reference numeral 121 in FIG. 29 is displayed. When dragging is performed on a diagonal line, image conversion is performed without changing the aspect ratio. When the third button of the mouse is depressed again, the mark indicated by reference numeral 123 in FIG. 30 is displayed again. In this state, when dragging is performed on a diagonal line, the aspect ratio of image conversion may be changed.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image processing apparatus having an image operation function for geometric conversion for displaying an original image displayed on a display unit in a predetermined display area, comprising:
   a central processing unit (CPU);
   a main memory for storing programs defining operations performed by the CPU;
   a display unit for displaying an image;
   wherein the CPU includes:
   means for obtaining two difference vectors having a main scanning direction and a sub scanning direction on original image coordinates of display area from coordinate positions of vertices of an area arbitrarily designated in the original image and a processing display area;
   separating means for separating coordinate components of each difference vector into an integral part and a decimal part;
   first density determining means for sequentially determining densities of coordinate positions in the display area on the basis of results obtained by sequentially adding the integral and decimal parts of the first difference vector separated by said separating means while performing scanning in a first coordinate axis direction of the display area;
   second density determining means for sequentially determining densities of coordinate positions in the display area on the basis of results obtained by sequentially adding the integral and decimal parts of the second difference vector separated by said separating means while performing scanning in a second coordinate axis direction of the display area; and
   means for determining densities in the first coordinate axis direction by said first density determining means from the coordinate positions determined by said second density determining means.

2. An image conversion method in an image processing apparatus having an image operation function for performing geometric conversion for displaying an original image displayed on a display unit in a predetermined display area, comprising the steps, performed by a CPU of the image processing apparatus, of:
   (a) obtaining two difference vectors having a main scanning direction and a sub scanning direction on original image coordinates of the display area from coordinate position of vertices of an area arbitrarily designated in the original image and a processing display area, and for separating coordinate components of each difference vector into an integral part and a decimal part;
   (b) sequentially determining densities of coordinate positions in the display area on the basis of results obtained by sequentially adding the integral and decimal parts of the first difference vector separated in the step (a) while performing scanning in a first coordinate axis direction of the display area;
   (c) sequentially determining densities of coordinate positions in the display area on the basis of results obtained by sequentially adding the integral and decimal parts of the second difference vector separated in the step (a) while performing scanning in a second coordinate axis direction of the display area; and
   (d) determining densities in the first coordinate axis direction by the first density determining step (b) from the coordinate positions determined by the second density determining step (c).

3. A data processing apparatus, comprising:
   a display unit for displaying an image;
   first designating means for designating and providing a first frame for an arbitrary first image area from image data to be edited;
   frame deforming means for changing a shape of the first frame;
   second designating means for designating and providing a second frame for a second image area for holding image data;
   image data converting means for converting the image data surrounded by the first frame, the shape of the first frame having been deformed by the frame deforming means to conform to the shape of the second frame designated by the second designating means; and
   means for displaying the image data converted by the image converting means in the second frame.

4. A data processing apparatus, comprising:
   a display unit for displaying an image;
   first designating means for designating an arbitrary first image area of a rectangular shape from image data to be edited, a control point being defined in each of the vertices of the rectangular shape, the control point designating an operation to be performed on the image data;
   area deforming means for changing the shape of the first image area;
   second designating means for designating a second image area for holding image data;
   image data converting means for converting the image data designated by the first image area, the shape of the first image area having been deformed by the area deforming means to conform to the shape of the second image area designated by the second designating means; and
   means for displaying the image data converted by the image converting means in the second image area.

5. The apparatus according to claim 4, wherein the area deforming means includes means for changing the shape of the first image area in accordance with a position of the control point.

6. The apparatus according to claim 5, wherein the shape changing means includes means for moving one designated vertex of four vertices defining the shape of the first image area while the other three vertices remain unchanged.

7. The apparatus according to claim 5, wherein the shape changing means includes means for continuously fixing a position of one vertex, moving a position of another vertex, and moving positions of two other vertices to positions so as to maintain an angle formed by sides of the first image area unchanged.

8. The apparatus according to claim 5, wherein the shape changing means includes means for moving a position of one designated vertex and moving positions of three other vertices so that a shape and a size of the first image area are kept unchanged.

9. The apparatus according to claim 4, further comprising:
a pointing device;
means for counting a number picked by the pointing device; and
means for changing the first image area corresponding to the number counted by the counting means.

10. The apparatus according to claim 4, further comprising means for deforming the second image area by setting the control points and for converting the image data in the second image area in correspondence with deforming of the second image area.

11. A data processing apparatus, comprising:
a display unit for displaying an image;
first designating means for designating an arbitrary first image area, having a shape, from image data to be edited;
area deforming means for changing the shape of the first image area;
second designating means for designating a second image area for holding image data;
image data converting means for converting the image data designated by the first image area, the shape of the first image area having been deformed by the area deforming means to conform to the shape of the second image area designated by the second designating means;
means for displaying the image data converted by the image converting means in the second image area; and
means for operating the image data as the operation object in accordance with the changing of the first image area by the area deforming means.

12. A data processing apparatus, comprising:
a display unit for displaying an image;
first designating means for designating an arbitrary first image area of a rectangular shape from image data to be edited, a control point being defined in each of the vertices of the rectangular shape, the control point designating an operation to be performed on the image data;
area deforming means for changing the shape of the first image area;
second designating means for designating a second image area for holding image data;
image data converting means for converting the image data designated by the first image area, the shape of the first image area having been deformed by the area deforming means to conform to the shape of the second image area designated by the second designating means; and
means for displaying the image data converted by the image converting means in the second image area while the area deforming means is operating on the first image.

13. A data processing apparatus, comprising:
a display unit for displaying an image;
first designating means for designating an arbitrary first image area, having a shape, from image data to be edited;
area deforming means for changing the shape of the first image area, the changing including at least one of a move operation, an enlargement operation, a reduction operation, a rotation operation, and a deforming operation;
second designating means for designating a second image area for holding image data;
image data converting means for converting the image data designated by the first image area, the shape of the first image area having been deformed by the area deforming means to conform to the shape of the second image area designated by the second designating means; and
means for displaying the image data converted by the image converting means in the second image area.

* * * * *